US010572864B2

(12) United States Patent
Hammad

(10) Patent No.: US 10,572,864 B2
(45) Date of Patent: *Feb. 25, 2020

(54) VERIFICATION OF PORTABLE CONSUMER DEVICES

(71) Applicant: Visa International Service Association, San Francisco, CA (US)

(72) Inventor: Ayman Hammad, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 321 days.

This patent is subject to a terminal disclaimer.

(21) Appl. No.: 15/618,500

(22) Filed: Jun. 9, 2017

(65) Prior Publication Data

US 2017/0300884 A1 Oct. 19, 2017

Related U.S. Application Data

(63) Continuation of application No. 12/780,801, filed on May 14, 2010, now Pat. No. 9,715,681, which is a
(Continued)

(51) Int. Cl.
*G06Q 40/00* (2012.01)
*G06Q 20/12* (2012.01)
(Continued)

(52) U.S. Cl.
CPC ............ *G06Q 20/12* (2013.01); *G06Q 20/20* (2013.01); *G06Q 20/40* (2013.01); *G06Q 20/42* (2013.01);
(Continued)

(58) Field of Classification Search
USPC ............ 705/30, 44, 35; 235/383, 380, 382; 707/769; 709/206
See application file for complete search history.

(56) References Cited

U.S. PATENT DOCUMENTS 5,336,870 A 8/1994 Hughes et al.
5,365,586 A 11/1994 Indeck et al.
(Continued)

FOREIGN PATENT DOCUMENTS

CN 101110113 1/2008
CN 101211436 7/2008
(Continued)

OTHER PUBLICATIONS

Notice of Allowance dated Mar. 1, 2016 in U.S. Appl. No. 13/411,400, 11 pages.
(Continued)

*Primary Examiner* — Oluseye Iwarere
*Assistant Examiner* — Reva R Danzig
(74) *Attorney, Agent, or Firm* — Kilpatrick Townsend & Stockton LLP

(57) ABSTRACT

Embodiments of the invention are directed to methods, systems, and computer program products pertaining to obtaining, providing, and using dynamic card verification values for portable consumer devices, such as credit cards and debit cards. An exemplary method comprises receiving, at a server, a request for a device verification value for a portable consumer device associated with a user; obtaining, at the server, a datum indicative of a device verification value for a portable consumer device; and sending, from the server, the datum to at least one of a phone number or network address of a personal communication device associated with the user.

23 Claims, 4 Drawing Sheets

Related U.S. Application Data continuation-in-part of application No. PCT/US2010/032825, filed on Apr. 28, 2010, and a continuation-in-part of application No. 12/768,661, filed on Apr. 27, 2010, now Pat. No. 8,326,759.

(60) Provisional application No. 61/178,636, filed on May 15, 2009, provisional application No. 61/173,371, filed on Apr. 28, 2009.

(51) Int. Cl.
*G06Q 20/20* (2012.01)
*G06Q 20/40* (2012.01)
*G06Q 20/42* (2012.01)
*G06Q 10/10* (2012.01)
*G06F 15/16* (2006.01)

(52) U.S. Cl.
CPC .......... *G06Q 20/425* (2013.01); *G06Q 40/00* (2013.01); *G06Q 40/12* (2013.12)

(56) References Cited

U.S. PATENT DOCUMENTS

| | | |
|---|---|---|
| 5,450,537 A | 9/1995 | Hirai et al. |
| 5,550,561 A | 8/1996 | Ziarno |
| 5,613,012 A | 3/1997 | Hoffman |
| 5,625,669 A | 4/1997 | McGregor et al. |
| 5,640,577 A | 6/1997 | Scharmer |
| 5,696,824 A | 12/1997 | Walsh |
| 5,729,591 A | 3/1998 | Bailey |
| 5,742,845 A | 4/1998 | Wagner |
| 5,781,438 A | 7/1998 | Lee |
| 5,794,259 A | 8/1998 | Kikinis |
| 5,883,810 A | 3/1999 | Franklin |
| 5,953,710 A | 9/1999 | Fleming |
| 5,956,699 A | 9/1999 | Wong |
| 5,974,430 A | 10/1999 | Mutschler, III et al. |
| 6,000,832 A | 12/1999 | Franklin |
| 6,014,635 A | 1/2000 | Harris |
| 6,032,859 A | 3/2000 | Muehlberger et al. |
| 6,044,349 A | 3/2000 | Tolopka et al. |
| 6,044,360 A | 3/2000 | Picciallo |
| 6,055,592 A | 4/2000 | Smith |
| 6,067,621 A | 5/2000 | Yu et al. |
| 6,163,771 A | 12/2000 | Walker |
| 6,227,447 B1 | 5/2001 | Campisano |
| 6,234,389 B1 | 5/2001 | Valliani et al. |
| 6,236,981 B1 | 5/2001 | Hill |
| 6,253,328 B1 | 6/2001 | Smith |
| 6,267,292 B1 | 7/2001 | Walker |
| 6,299,062 B1 | 10/2001 | Hwang |
| 6,327,578 B1 | 12/2001 | Linehan |
| 6,341,724 B2 | 1/2002 | Campisano |
| 6,354,496 B1 | 3/2002 | Murphy et al. |
| 6,385,596 B1 | 5/2002 | Wiser |
| 6,421,729 B1 | 7/2002 | Paltenghe et al. |
| 6,422,462 B1 | 7/2002 | Cohen |
| 6,425,523 B1 | 7/2002 | Shem Ur |
| 6,449,347 B1 | 9/2002 | Ple et al. |
| 6,490,601 B1 | 12/2002 | Markus et al. |
| 6,499,042 B1 | 12/2002 | Markus |
| 6,560,709 B1 | 5/2003 | Galovich |
| 6,571,339 B1 | 5/2003 | Danneels et al. |
| 6,592,044 B1 | 7/2003 | Wong |
| 6,636,833 B1 | 10/2003 | Flitcroft |
| 6,685,095 B2 | 2/2004 | Roustaei et al. |
| 6,738,749 B1 | 5/2004 | Chasko |
| 6,748,367 B1 | 6/2004 | Lee |
| 6,805,287 B2 | 10/2004 | Bishop |
| 6,850,996 B2 | 2/2005 | Wagner |
| 6,873,974 B1 | 3/2005 | Schutzer |
| 6,879,965 B2 | 4/2005 | Fung |
| 6,891,953 B1 | 5/2005 | DeMello |
| 6,901,387 B2 | 5/2005 | Wells |
| 6,907,476 B2 | 6/2005 | Wagner |
| 6,931,382 B2 | 8/2005 | Laage |
| 6,938,019 B1 | 8/2005 | Uzo |
| 6,941,285 B2 | 9/2005 | Sarcanin |
| 6,947,908 B1 | 9/2005 | Slater |
| 6,980,670 B1 | 12/2005 | Hoffman |
| 6,983,882 B2 | 1/2006 | Cassone |
| 6,990,470 B2 | 1/2006 | Hogan |
| 6,991,157 B2 | 1/2006 | Bishop |
| 6,993,658 B1 | 1/2006 | Engberg |
| 7,007,840 B2 | 3/2006 | Davis |
| 7,051,929 B2 | 5/2006 | Li |
| 7,062,706 B2 | 6/2006 | Maxwell et al. |
| 7,069,249 B2 | 6/2006 | Stolfo |
| 7,080,048 B1 | 7/2006 | Sines et al. |
| 7,103,576 B2 | 9/2006 | Mann, III |
| 7,111,324 B2 | 9/2006 | Elteto et al. |
| 7,113,930 B2 | 9/2006 | Eccles |
| 7,136,835 B1 | 11/2006 | Flitcroft |
| 7,159,180 B2 | 1/2007 | Ward |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,210,169 B2 | 4/2007 | Smith et al. |
| 7,216,292 B1 | 5/2007 | Snapper et al. |
| 7,231,045 B1 | 6/2007 | Parrott |
| 7,254,560 B2 | 8/2007 | Singhal |
| 7,254,569 B2 | 8/2007 | Goodman et al. |
| 7,257,581 B1 | 8/2007 | Steele et al. |
| 7,264,154 B2 | 9/2007 | Harris |
| 7,275,263 B2 | 9/2007 | Bajikar et al. |
| 7,275,685 B2 | 10/2007 | Gray et al. |
| 7,287,692 B1 | 10/2007 | Patel |
| 7,292,999 B2 | 11/2007 | Hobson |
| 7,334,184 B1 | 2/2008 | Simons |
| 7,343,351 B1 | 3/2008 | Bishop et al. |
| 7,346,587 B2 | 3/2008 | Goldstein et al. |
| 7,347,361 B2 | 3/2008 | Lovett |
| 7,350,139 B1 | 3/2008 | Simons |
| 7,350,230 B2 | 3/2008 | Forrest |
| 7,353,382 B2 | 4/2008 | Labrou |
| 7,356,706 B2 | 4/2008 | Scheurich |
| 7,366,703 B2 | 4/2008 | Gray et al. |
| 7,379,919 B2 | 5/2008 | Hogan |
| RE40,444 E | 7/2008 | Linehan |
| 7,412,420 B2 | 8/2008 | Holdsworth |
| 7,412,422 B2 | 8/2008 | Shiloh |
| 7,415,443 B2 | 8/2008 | Hobson et al. |
| 7,427,033 B1 | 9/2008 | Roskind |
| 7,430,540 B1 | 9/2008 | Asani |
| 7,431,202 B1 | 10/2008 | Meador et al. |
| 7,437,575 B2 | 10/2008 | Dennis et al. |
| 7,437,757 B2 | 10/2008 | Holdsworth |
| 7,444,676 B1 | 10/2008 | Asghari-Kamrani |
| 7,469,151 B2 | 12/2008 | Khan |
| 7,483,845 B2 | 1/2009 | Vetelainen |
| 7,512,975 B2 | 3/2009 | Aissi |
| 7,523,859 B2 | 4/2009 | Patel et al. |
| 7,533,063 B2 | 5/2009 | Kianian |
| 7,533,828 B2 | 5/2009 | Ong |
| 7,543,738 B1 | 6/2009 | Saunders et al. |
| 7,548,889 B2 | 6/2009 | Bhambri |
| 7,567,934 B2 | 7/2009 | Flitcroft |
| 7,567,936 B1 | 7/2009 | Peckover |
| 7,568,631 B2 | 8/2009 | Gibbs et al. |
| 7,571,139 B1 | 8/2009 | Giordano |
| 7,571,142 B1 | 8/2009 | Flitcroft |
| 7,580,898 B2 | 8/2009 | Brown et al. |
| 7,584,153 B2 | 9/2009 | Brown |
| 7,593,896 B1 | 9/2009 | Flitcroft |
| 7,599,863 B2 | 10/2009 | Sines et al. |
| 7,606,560 B2 | 10/2009 | Labrou |
| 7,627,531 B2 | 12/2009 | Breck et al. |
| 7,627,895 B2 | 12/2009 | Gifford |
| 7,650,314 B1 | 1/2010 | Saunders |
| 7,660,779 B2 | 2/2010 | Goodman et al. |
| 7,664,699 B1 | 2/2010 | Powell |
| 7,685,037 B2 | 3/2010 | Reiners |

(56) References Cited

U.S. PATENT DOCUMENTS

| | | |
|---|---|---|
| 7,694,130 B1 | 4/2010 | Martinez |
| 7,702,578 B2 | 4/2010 | Fung |
| 7,707,120 B2 | 4/2010 | Dominguez |
| 7,712,655 B2 | 5/2010 | Wong |
| 7,716,596 B2 | 5/2010 | Cao et al. |
| 7,734,527 B2 | 6/2010 | Uzo |
| 7,753,265 B2 | 7/2010 | Harris |
| 7,761,374 B2 | 7/2010 | Sahota et al. |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,014 B2 | 12/2010 | Erikson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,560 B2 | 2/2011 | Hammad |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Mcato |
| 7,931,195 B2 | 4/2011 | Mullen |
| 7,938,318 B2 | 5/2011 | Fein |
| 7,954,705 B2 | 6/2011 | Mullen |
| 7,959,076 B1 | 6/2011 | Hopkins, III |
| 7,966,257 B2 | 6/2011 | DiGioacchino |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,171,525 B1 | 5/2012 | Pelly |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,226 B2 | 5/2013 | Hammad |
| 8,453,925 B2 | 6/2013 | Fisher |
| 8,458,487 B2 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,533,860 B1 | 9/2013 | Grecia |
| 8,534,564 B2 | 9/2013 | Hammad |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,602,293 B2 | 12/2013 | Hammad |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,762,263 B2 | 6/2014 | Gauthier et al. |
| 8,827,154 B2 | 9/2014 | Hammad |
| 8,838,982 B2 | 9/2014 | Carlson et al. |
| 8,856,539 B2 | 10/2014 | Weiss |
| 8,887,308 B2 | 11/2014 | Grecia |
| 8,893,967 B2 | 11/2014 | Hammad |
| 9,038,886 B2 | 5/2015 | Hammad |
| 9,065,643 B2 | 6/2015 | Hurry et al. |
| 9,070,129 B2 | 6/2015 | Sheets et al. |
| 9,100,826 B2 | 8/2015 | Weiss |
| 9,105,027 B2 | 8/2015 | Hammad et al. |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,317,848 B2 | 4/2016 | Hammad |
| 9,372,971 B2 | 6/2016 | Hammad |
| 9,424,413 B2 | 8/2016 | Hammad |
| 9,530,137 B2 | 12/2016 | Weiss |
| 2001/0029485 A1 | 10/2001 | Brody |
| 2001/0032182 A1 | 10/2001 | Kumar et al. |
| 2001/0032192 A1 | 10/2001 | Putta et al. |
| 2001/0034720 A1 | 10/2001 | Armes |
| 2001/0042785 A1* | 11/2001 | Walker .................. G06Q 20/10 235/379 |
| 2001/0051924 A1 | 12/2001 | Uberti |
| 2001/0054003 A1 | 12/2001 | Chien |
| 2001/0054148 A1 | 12/2001 | Hoornaert et al. |
| 2002/0007320 A1 | 1/2002 | Hogan |
| 2002/0016749 A1 | 2/2002 | Borecki |
| 2002/0023054 A1 | 2/2002 | Gillespie |
| 2002/0029193 A1 | 3/2002 | Ranjan |
| 2002/0035539 A1 | 3/2002 | O'Connell |

(56) References Cited

U.S. PATENT DOCUMENTS

| | | |
|---|---|---|
| 2002/0035548 A1 | 3/2002 | Hogan |
| 2002/0038286 A1 | 3/2002 | Koren et al. |
| 2002/0044689 A1 | 4/2002 | Roustaei et al. |
| 2002/0055909 A1 | 5/2002 | Fung |
| 2002/0059146 A1 | 5/2002 | Keech |
| 2002/0073045 A1 | 6/2002 | Rubin |
| 2002/0077837 A1 | 6/2002 | Krueger et al. |
| 2002/0091877 A1 | 7/2002 | Karidis |
| 2002/0107791 A1 | 8/2002 | Nobrega et al. |
| 2002/0116341 A1 | 8/2002 | Hogan |
| 2002/0128977 A1 | 9/2002 | Nambiar et al. |
| 2002/0133467 A1 | 9/2002 | Hobson |
| 2002/0147913 A1 | 10/2002 | Lun Yip |
| 2002/0170960 A1 | 11/2002 | Ehrensvard et al. |
| 2003/0028481 A1 | 2/2003 | Flitcroft |
| 2003/0038835 A1 | 2/2003 | DeFelice |
| 2003/0057219 A1 | 3/2003 | Risolia |
| 2003/0097561 A1 | 5/2003 | Wheeler |
| 2003/0115142 A1 | 6/2003 | Brickell et al. |
| 2003/0126094 A1 | 7/2003 | Fisher et al. |
| 2003/0130955 A1 | 7/2003 | Hawthorne |
| 2003/0142855 A1 | 7/2003 | Kuo et al. |
| 2003/0191709 A1 | 10/2003 | Elston |
| 2003/0191945 A1 | 10/2003 | Keech |
| 2003/0200184 A1 | 10/2003 | Dominguez et al. |
| 2003/0212642 A1 | 11/2003 | Weller et al. |
| 2004/0010462 A1 | 1/2004 | Moon |
| 2004/0039651 A1 | 2/2004 | Grunzig |
| 2004/0050928 A1 | 3/2004 | Bishop |
| 2004/0058705 A1 | 3/2004 | Morgan et al. |
| 2004/0059682 A1 | 3/2004 | Hasumi |
| 2004/0093281 A1 | 5/2004 | Silverstein |
| 2004/0104268 A1 | 6/2004 | Bailey |
| 2004/0127256 A1 | 7/2004 | Goldthwaite et al. |
| 2004/0139008 A1 | 7/2004 | Mascavage |
| 2004/0143532 A1 | 7/2004 | Lee |
| 2004/0158532 A1 | 8/2004 | Breck |
| 2004/0188519 A1 | 9/2004 | Cassone |
| 2004/0210449 A1 | 10/2004 | Breck |
| 2004/0210498 A1 | 10/2004 | Freund |
| 2004/0210821 A1 | 10/2004 | Kasser |
| 2004/0226999 A1 | 11/2004 | Ruat et al. |
| 2004/0232225 A1 | 11/2004 | Bishop |
| 2004/0248554 A1 | 12/2004 | Khan et al. |
| 2004/0254890 A1 | 12/2004 | Sancho et al. |
| 2004/0260646 A1 | 12/2004 | Berardi |
| 2004/0267672 A1 | 12/2004 | Gray et al. |
| 2005/0036611 A1 | 2/2005 | Seaton, Jr. et al. |
| 2005/0037735 A1 | 2/2005 | Coutts |
| 2005/0043997 A1 | 2/2005 | Sahota et al. |
| 2005/0065875 A1 | 3/2005 | Beard |
| 2005/0077349 A1 | 4/2005 | Bonalle et al. |
| 2005/0080730 A1 | 4/2005 | Sorrentino |
| 2005/0108178 A1 | 5/2005 | York |
| 2005/0108569 A1 | 5/2005 | Bantz et al. |
| 2005/0109838 A1 | 5/2005 | Linlor |
| 2005/0127164 A1 | 6/2005 | Wankmueller |
| 2005/0156026 A1 | 7/2005 | Ghosh |
| 2005/0187873 A1 | 8/2005 | Labrou |
| 2005/0199709 A1 | 9/2005 | Linlor |
| 2005/0246293 A1 | 11/2005 | Ong |
| 2005/0250538 A1 | 11/2005 | Narasimhan |
| 2005/0269401 A1 | 12/2005 | Spitzer |
| 2005/0269402 A1 | 12/2005 | Spitzer |
| 2005/0278461 A1 | 12/2005 | Ohta |
| 2006/0016879 A1 | 1/2006 | Kean |
| 2006/0026098 A1 | 2/2006 | Peckover et al. |
| 2006/0131390 A1 | 6/2006 | Kim |
| 2006/0142058 A1 | 6/2006 | Elias et al. |
| 2006/0168653 A1 | 7/2006 | Contrera |
| 2006/0175396 A1 | 8/2006 | Call et al. |
| 2006/0235795 A1 | 10/2006 | Johnson |
| 2006/0237528 A1 | 10/2006 | Bishop |
| 2006/0253389 A1 | 11/2006 | Hagale |
| 2006/0278704 A1 | 12/2006 | Saunders |
| 2006/0294023 A1 | 12/2006 | Lu |
| 2006/0294095 A1 | 12/2006 | Berk et al. |
| 2007/0005685 A1 | 1/2007 | Chau et al. |
| 2007/0022058 A1 | 1/2007 | Labrou |
| 2007/0083444 A1 | 4/2007 | Matthews et al. |
| 2007/0107044 A1 | 5/2007 | Yuen |
| 2007/0114274 A1 | 5/2007 | Gibbs |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0178883 A1 | 8/2007 | Nandagopal |
| 2007/0179885 A1 | 8/2007 | Bird |
| 2007/0185820 A1 | 8/2007 | Talker |
| 2007/0185821 A1 | 8/2007 | Wells et al. |
| 2007/0208671 A1 | 9/2007 | Brown |
| 2007/0228148 A1 | 10/2007 | Rable |
| 2007/0245414 A1 | 10/2007 | Chan |
| 2007/0272743 A1 | 11/2007 | Christie et al. |
| 2007/0284433 A1 | 12/2007 | Domenica et al. |
| 2007/0284443 A1 | 12/2007 | Anson et al. |
| 2007/0288377 A1 | 12/2007 | Shaked |
| 2007/0290034 A1 | 12/2007 | Routhenstein |
| 2007/0291995 A1 | 12/2007 | Rivera |
| 2008/0001744 A1 | 1/2008 | Batra et al. |
| 2008/0011823 A1 | 1/2008 | Patel |
| 2008/0014867 A1 | 1/2008 | Finn |
| 2008/0015988 A1 | 1/2008 | Brown |
| 2008/0029607 A1 | 2/2008 | Mullen |
| 2008/0034221 A1 | 2/2008 | Hammad et al. |
| 2008/0035738 A1 | 2/2008 | Mullen |
| 2008/0040276 A1 | 2/2008 | Hammad et al. |
| 2008/0040285 A1 | 2/2008 | Wankmueller |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0071681 A1 | 3/2008 | Khalid |
| 2008/0097925 A1 | 4/2008 | King |
| 2008/0103984 A1 | 5/2008 | Choe |
| 2008/0110983 A1 | 5/2008 | Ashfield |
| 2008/0120214 A1 | 5/2008 | Steele et al. |
| 2008/0142582 A1 | 6/2008 | Corioni |
| 2008/0154770 A1 | 6/2008 | Rutherford et al. |
| 2008/0162312 A1 | 7/2008 | Sklovsky et al. |
| 2008/0177796 A1 | 7/2008 | Eldering |
| 2008/0201264 A1 | 8/2008 | Brown |
| 2008/0201265 A1 | 8/2008 | Hewton |
| 2008/0203152 A1 | 8/2008 | Hammad |
| 2008/0228646 A1 | 9/2008 | Myers |
| 2008/0228653 A1 | 9/2008 | Holdsworth |
| 2008/0243702 A1 | 10/2008 | Hart |
| 2008/0245855 A1 | 10/2008 | Fein |
| 2008/0245861 A1 | 10/2008 | Fein |
| 2008/0275779 A1 | 11/2008 | Lakshminarayanan |
| 2008/0283591 A1 | 11/2008 | Oder, II |
| 2008/0289022 A1 | 11/2008 | Chiu |
| 2008/0302869 A1 | 12/2008 | Mullen |
| 2008/0302876 A1 | 12/2008 | Mullen |
| 2008/0305769 A1 | 12/2008 | Rubinstein et al. |
| 2008/0306876 A1 | 12/2008 | Horvath et al. |
| 2008/0313264 A1 | 12/2008 | Pestoni |
| 2008/0319869 A1 | 12/2008 | Carlson et al. |
| 2008/0319905 A1 | 12/2008 | Carlson |
| 2009/0006262 A1 | 1/2009 | Brown |
| 2009/0006646 A1 | 1/2009 | Duarte |
| 2009/0010488 A1 | 1/2009 | Matsuoka |
| 2009/0018959 A1 | 1/2009 | Doran et al. |
| 2009/0037333 A1 | 2/2009 | Flitcroft |
| 2009/0037388 A1 | 2/2009 | Cooper et al. |
| 2009/0043702 A1 | 2/2009 | Bennett |
| 2009/0044268 A1 | 2/2009 | Tak |
| 2009/0048971 A1 | 2/2009 | Hathaway |
| 2009/0104888 A1 | 4/2009 | Cox |
| 2009/0106112 A1 | 4/2009 | Dalmia |
| 2009/0106138 A1 | 4/2009 | Smith et al. |
| 2009/0106160 A1 | 4/2009 | Skowronek |

(56) References Cited

U.S. PATENT DOCUMENTS

| | | |
|---|---|---|
| 2009/0124234 A1 | 5/2009 | Fisher |
| 2009/0125446 A1 | 5/2009 | Saunders et al. |
| 2009/0132413 A1 | 5/2009 | Engelbrecht |
| 2009/0134217 A1 | 5/2009 | Flitcroft |
| 2009/0157555 A1 | 6/2009 | Biffle |
| 2009/0159673 A1 | 6/2009 | Mullen |
| 2009/0159700 A1 | 6/2009 | Mullen |
| 2009/0159707 A1 | 6/2009 | Mullen |
| 2009/0160617 A1 | 6/2009 | Mullen |
| 2009/0173782 A1* | 7/2009 | Muscato ............... G06Q 20/10 235/379 |
| 2009/0200371 A1 | 8/2009 | Kean |
| 2009/0219430 A1* | 9/2009 | Okamoto ............... H04N 5/232 348/333.03 |
| 2009/0248583 A1 | 10/2009 | Chhabra |
| 2009/0249462 A1 | 10/2009 | Chhabra |
| 2009/0254986 A1 | 10/2009 | Harris et al. |
| 2009/0255987 A1 | 10/2009 | Olivares Baena |
| 2009/0265260 A1 | 10/2009 | Aabye et al. |
| 2009/2544986 | 10/2009 | Harris et al. |
| 2009/0276347 A1 | 11/2009 | Kargman |
| 2009/0281948 A1 | 11/2009 | Carlson |
| 2009/0289110 A1 | 11/2009 | Regen et al. |
| 2009/0292631 A1 | 11/2009 | Wells et al. |
| 2009/0294527 A1 | 12/2009 | Brabson |
| 2009/0307139 A1 | 12/2009 | Mardikar |
| 2009/0307140 A1 | 12/2009 | Mardika |
| 2009/0307493 A1 | 12/2009 | Smith |
| 2009/0308921 A1 | 12/2009 | Mullen |
| 2009/0313168 A1* | 12/2009 | Manessis ............... G06Q 20/20 705/44 |
| 2009/0319430 A1 | 12/2009 | Faith et al. |
| 2009/0319431 A1 | 12/2009 | Aiello et al. |
| 2009/0319784 A1* | 12/2009 | Faith ............... G06Q 20/32 713/158 |
| 2009/0327131 A1 | 12/2009 | Beenau |
| 2010/0008535 A1 | 1/2010 | Abulafia |
| 2010/0023400 A1 | 1/2010 | Dewitt |
| 2010/0088237 A1 | 4/2010 | Wankmueller |
| 2010/0094755 A1 | 4/2010 | Kloster |
| 2010/0100481 A1 | 4/2010 | Doran et al. |
| 2010/0106644 A1 | 4/2010 | Annan |
| 2010/0114776 A1 | 5/2010 | Weller et al. |
| 2010/0120408 A1 | 5/2010 | Beenau |
| 2010/0125516 A1 | 5/2010 | Wankmueller et al. |
| 2010/0133334 A1 | 6/2010 | Vadhri |
| 2010/0133335 A1 | 6/2010 | Maguid |
| 2010/0138347 A1 | 6/2010 | Chen |
| 2010/0145860 A1 | 6/2010 | Pelegero |
| 2010/0161433 A1 | 6/2010 | White |
| 2010/0174556 A1 | 7/2010 | Wilkins et al. |
| 2010/0176935 A1 | 7/2010 | Phillips |
| 2010/0185545 A1 | 7/2010 | Royyuru |
| 2010/0186073 A1 | 7/2010 | Curtis |
| 2010/0191613 A1 | 7/2010 | Raleigh |
| 2010/0211505 A1 | 8/2010 | Saunders |
| 2010/0223184 A1 | 9/2010 | Perlman |
| 2010/0223186 A1 | 9/2010 | Hogan |
| 2010/0228668 A1 | 9/2010 | Hogan |
| 2010/0235284 A1 | 9/2010 | Moore |
| 2010/0257102 A1 | 10/2010 | Perlman |
| 2010/0258620 A1 | 10/2010 | Torreyson |
| 2010/0260388 A1 | 10/2010 | Garrett |
| 2010/0274692 A1 | 10/2010 | Hammad |
| 2010/0274721 A1 | 10/2010 | Hammad |
| 2010/0291904 A1 | 11/2010 | Mfeldt |
| 2010/0293189 A1 | 11/2010 | Hammad |
| 2010/0293381 A1 | 11/2010 | Hammad |
| 2010/0293382 A1 | 11/2010 | Hammad |
| 2010/0299267 A1 | 11/2010 | Faith et al. |
| 2010/0306076 A1 | 12/2010 | Taveau |
| 2010/0318801 A1 | 12/2010 | Roberge et al. |
| 2010/0325041 A1 | 12/2010 | Berardi |
| 2010/0327054 A1 | 12/2010 | Hammad |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0108623 A1 | 5/2011 | Hammad |
| 2011/0125597 A1 | 5/2011 | Oder, II |
| 2011/0140841 A1 | 6/2011 | Bona |
| 2011/0153437 A1 | 6/2011 | Archer |
| 2011/0153498 A1 | 6/2011 | Makhotin et al. |
| 2011/0154466 A1 | 6/2011 | Harper |
| 2011/0154467 A1 | 6/2011 | Bomar et al. |
| 2011/0161233 A1 | 6/2011 | Tieken |
| 2011/0178926 A1 | 7/2011 | Lindelsee et al. |
| 2011/0184867 A1 | 7/2011 | Varadarajan |
| 2011/0191244 A1 | 8/2011 | Dai |
| 2011/0208658 A1 | 8/2011 | Makhotin |
| 2011/0238511 A1 | 9/2011 | Park |
| 2011/0238573 A1 | 9/2011 | Varadarajan |
| 2011/0238579 A1 | 9/2011 | Coppinger |
| 2011/0240740 A1 | 10/2011 | Li et al. |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276418 A1 | 11/2011 | Velani |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2011/0307710 A1 | 12/2011 | McGuire et al. |
| 2012/0018506 A1 | 1/2012 | Hammad et al. |
| 2012/0018511 A1 | 1/2012 | Hammad |
| 2012/0024946 A1 | 2/2012 | Tullis et al. |
| 2012/0028609 A1 | 2/2012 | Hruska |
| 2012/0030047 A1 | 2/2012 | Fuentes et al. |
| 2012/0031969 A1 | 2/2012 | Hammad |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0116976 A1 | 5/2012 | Hammad et al. |
| 2012/0123882 A1 | 5/2012 | Carlson |
| 2012/0123940 A1 | 5/2012 | Killian |
| 2012/0129514 A1 | 5/2012 | Beenau |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |

(56) References Cited

U.S. PATENT DOCUMENTS

| | | |
|---|---|---|
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Mcato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0238499 A1 | 9/2013 | Hammad |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0061302 A1 | 3/2014 | Hammad |
| 2014/0068706 A1 | 3/2014 | Aissi |
| 2014/0074637 A1 | 3/2014 | Hammad |
| 2014/0108172 A1 | 4/2014 | Weber et al. |
| 2014/0110477 A1 | 4/2014 | Hammad |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0294701 A1 | 10/2014 | Dai et al. |
| 2014/0310183 A1 | 10/2014 | Weber |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0134537 A1 | 5/2015 | Hammad |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0317625 A1 | 11/2015 | Hammad |
| 2015/0319158 A1 | 11/2015 | Kumnick |
| 2015/0332262 A1 | 11/2015 | Lingappa |
| 2015/0356560 A1 | 12/2015 | Shastry et al. |

(56) References Cited

U.S. PATENT DOCUMENTS

| | | |
|---|---|---|
| 2015/0379515 A1 | 12/2015 | Hammad |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0218875 A1 | 7/2016 | Le Saint et al. |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0275501 A1 | 9/2016 | Hammad |
| 2016/0371688 A1 | 12/2016 | Hammad |
| 2016/0379217 A1 | 12/2016 | Hammad |
| 2017/0300884 A1 | 10/2017 | Hammad |
| 2018/0005238 A1 | 1/2018 | Hammad |

FOREIGN PATENT DOCUMENTS

| | | |
|---|---|---|
| CN | 101485128 | 7/2009 |
| CN | 101512957 | 8/2009 |
| CN | 101582121 | 11/2009 |
| CN | 103270524 | 8/2013 |
| EA | 11495 B1 | 2/2008 |
| EP | 1168265 | 1/2002 |
| EP | 1840814 A1 | 10/2007 |
| EP | 2098985 | 9/2009 |
| EP | 2156397 | 2/2010 |
| GB | 2459850 | 11/2009 |
| JP | 2008-210370 | 9/2008 |
| KR | 10-2000-0054496 | 9/2000 |
| KR | 10-2003-0020189 A | 3/2003 |
| KR | 10-2005-0019674 A | 3/2005 |
| KR | 10-2006-0022304 A | 3/2006 |
| KR | 10-2006-0096821 A | 9/2006 |
| KR | 10-2006-0111200 A | 10/2006 |
| KR | 10-2007-0100076 | 10/2007 |
| KR | 10-2008-0026802 | 3/2008 |
| KR | 10-2008-0039330 | 5/2008 |
| KR | 10-2008-0051198 A | 6/2008 |
| KR | 10-2009-0021388 | 3/2009 |
| KR | 10-2009-0044619 | 5/2009 |
| KR | 10-2010-0110642 | 10/2010 |
| RU | 2252451 | 5/2005 |
| RU | 2331110 C2 | 8/2008 |
| RU | 2011148229 | 6/2013 |
| WO | 01/16900 | 3/2001 |
| WO | 2001/017296 A1 | 3/2001 |
| WO | 2001/084509 A2 | 11/2001 |
| WO | 2001088785 A1 | 11/2001 |
| WO | 02/01520 | 1/2002 |
| WO | 2001035304 | 5/2002 |
| WO | 02/059727 | 8/2002 |
| WO | 03/047208 | 6/2003 |
| WO | 3073389 | 9/2003 |
| WO | 2003075192 A1 | 9/2003 |
| WO | 2004042536 | 5/2004 |
| WO | 2005001618 | 1/2005 |
| WO | 2005001635 | 1/2005 |
| WO | 2005073931 A2 | 8/2005 |
| WO | 2005/109360 | 11/2005 |
| WO | 2006/099294 | 9/2006 |
| WO | 2006113834 | 10/2006 |
| WO | 2008/014554 | 2/2008 |
| WO | 2009/003030 A2 | 12/2008 |
| WO | 2009/025605 | 2/2009 |
| WO | 2009032523 | 3/2009 |
| WO | 2009/052634 | 4/2009 |
| WO | 2009/136404 A2 | 11/2009 |
| WO | 2010078522 | 7/2010 |
| WO | 2010129357 | 11/2010 |
| WO | 2011057007 | 5/2011 |
| WO | 2011031988 | 7/2011 |
| WO | 2012054763 | 4/2012 |
| WO | 2012058309 | 5/2012 |
| WO | 2012068078 | 5/2012 |
| WO | 2012098556 | 7/2012 |
| WO | 2012142370 | 10/2012 |
| WO | 2012167941 | 12/2012 |
| WO | 2013048538 | 4/2013 |
| WO | 2013056104 | 4/2013 |
| WO | 2013119914 | 8/2013 |
| WO | 2013179271 | 12/2013 |

OTHER PUBLICATIONS

Notice of Allowance dated Jun. 15, 2017 in U.S. Appl. No. 14/732,294, 9 pages.

Office Action dated Apr. 20, 2017 in U.S. Appl. No. 14/681,668, 14 pages.

Gillick, Kevin, "Trusted Execution Environment (TEE) Guide," Global Platform, Feb. 12, 2012, https://web.archive.org/web/20120212221931/http://www.globalplatform.org/mediaguidetee.asp.

"2.4.2 How VISA Card Verification Values are Used," 2.4.2 "z/OS V1R3.0 ICSF Application Programmer's Guide" IBM Library Server, 1 page, © Copyright IBM Corp. 1997, 2002, downloaded Mar. 27, 2012 from URL: http://publibz.boulder.ibm.com/cgi-bin/bookmgr_OS390/BOOKS/CSFB4Z20/2.4.2?SHEL.

Security Concerns Usher in "Disposable" Credit Cards, Credit Card News, Sep. 15, 2000, 1 page.

Office Action dated Aug. 28, 2015 in U.S. Appl. No. 13/411,400, 19 pages.

Reisinger, D., "PayPal offers SMS security key for mobile users," Nov. 24, 2008, pp. 1-3, © Copyright CBS Interactive, downloaded Mar. 27, 2012 from URL: http://news.cnet/com/8301-17939_1209-10106410-2.html.

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

Wang, U.S. Appl. No. 62/000,288 (unpublished), Payment System Canonical Address Format filed May 19, 2014.

Sharma et al., U.S. Appl. No. 62/003,717 (unpublished), Mobile Merchant Application filed May 28, 2014.

Kalgi et al., U.S. Appl. No. 62/024,426, (unpublished) Secure Transactions Using Mobile Devices filed Jul. 14, 2014.

Prakash et al., U.S. Appl. No. 62/037,033 (unpublished), Sharing Payment Token filed Aug. 13, 2014.

Hoverson et al., U.S. Appl. No. 62/038,174 (unpublished), Customized Payment Gateway filed Aug. 15, 2014.

Wang, U.S. Appl. No. 62/042,050 (unpublished), Payment Device Authentication and Authorization System filed Aug. 26, 2014.

Gaddam et al., U.S. Appl. No. 62/053,736 (unpublished), Completing Transactions Without a User Payment Device filed Sep. 22, 2014.

Patterson, U.S. Appl. No. 62/054,346 (unpublished), Mirrored Token Vault filed Sep. 23, 2014.

Dimmick, U.S. Appl. No. 14/952,514 (unpublished), Systems Communications With Non-Sensitive Identifiers filed Nov. 25, 2015.

Dimmick, U.S. Appl. No. 14/952,444 (unpublished), Tokenization Request Via Access Device filed Nov. 25, 2015.

Prakash et al., U.S. Appl. No. 14/955,716 (unpublished), Provisioning Platform for Machine-To-Machine Devices filed Dec. 1, 2015.

Wong et al., U.S. Appl. No. 14/966,948 (unpublished), Automated Access Data Provisioning filed Dec. 11, 2015.

Stubbs et al., U.S. Appl. No. 62/103,522 (unpublished), Methods and Systems for Wallet Provider Provisioning filed Jan. 14, 2015.

McGuire, U.S. Appl. No. 14/600,523 (unpublished), Secure Payment Processing Using Authorization Request filed Jan. 20, 2015.

(56) References Cited

OTHER PUBLICATIONS

Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Sabba et al., U.S. Appl. No. 15/011,366 (unpublished), Token Check Offline filed Jan. 29, 2016.
Patterson, U.S. Appl. No. 15/019,157 (unpublished), Token Processing Utilizing Multiple Authorizations filed Feb. 9, 2016.
Cash et al., U.S. Appl. No. 15/041,495 (unpublished), Peer Forward Authorization of Digital Requests filed Feb. 11, 2016.
Le Saint et al., U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
Notice of Allowance dated Jun. 15, 2016 in U.S. Appl. No. 14/511,034, 7 pages.
Office Action dated Aug. 25, 2016 in U.S. Appl. No. 14/681,668, 13 pages.
European Examination Report dated Nov. 11, 2016 in EP 10772579.8, 8 pages.
Notice of Allowance dated Mar. 21, 2019 in U.S. Appl. No. 15/977,921, 10 pages.
Office Action dated Mar. 21, 2019 in U.S. Appl. No. 15/252,595, 10 pages.
Final Office Action dated Aug. 27, 2018 in U.S. Appl. No. 13/413,484, 18 pages.
Office Action dated Jul. 14, 2017 in U.S. Appl. No. 15/070,446, 8 pages.
Office Action dated Feb. 6, 2018 in U.S. Appl. No. 13/413,484, 15 pages.
Notice of Allowance dated Feb. 12, 2018 in U.S. Appl. No. 15/070,446, 10 pages.

\* cited by examiner

| Mobile Phone Number | Network Address | User's Unique ID code | | | |
|---|---|---|---|---|---|
| Consumer Account A | Account Number for Account A | Code Phrase for Account A | Reply Route for Account A | dCVV2 Method for Account A | Parameters for Account A |
| Consumer Account B | Account Number for Account B | Code Phrase for Account B | Reply Route for Account B | dCVV2 Method for Account B | Parameters for Account B |
| Consumer Account C | Account Number for Account C | Code Phrase for Account C | Reply Route for Account C | dCVV2 Method for Account C | Parameters for Account C |

*FIG. 2*

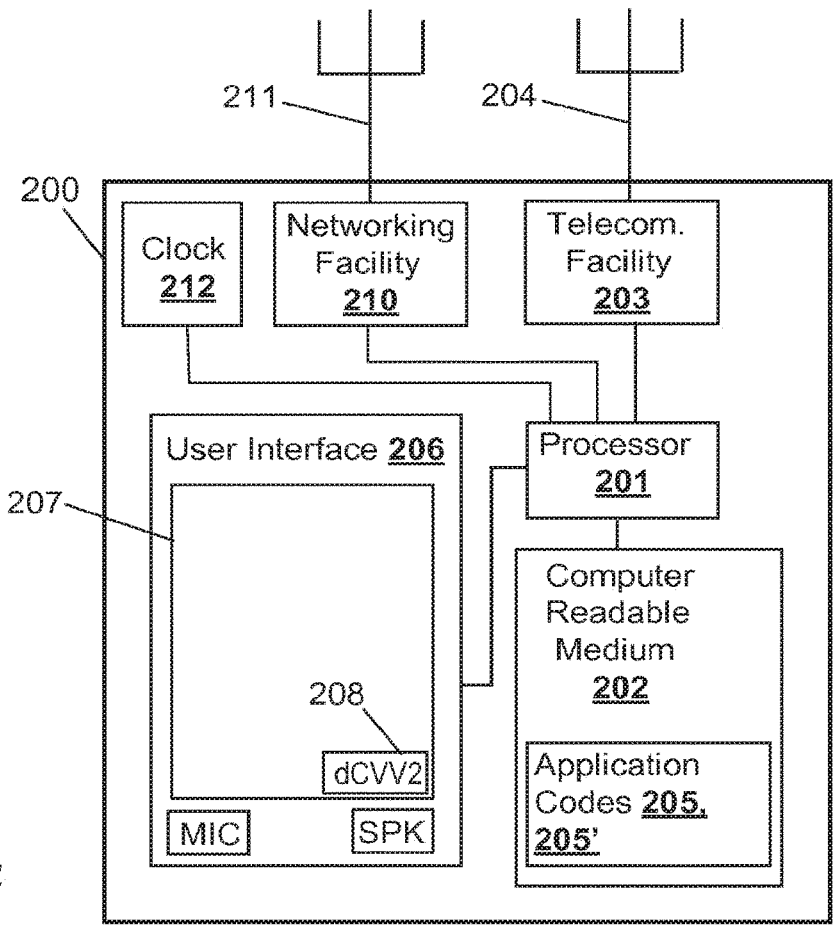

*FIG. 4*

VERIFICATION OF PORTABLE CONSUMER DEVICES

CROSS-REFERENCE TO RELATED APPLICATIONS

This application is a continuation application of U.S. patent application Ser. No. 12/780,801, filed May 14, 2010, which is a continuation-in-part of PCT application No. PCT/US2010/032825, filed Apr. 28, 2010, and a continuation-in-part of U.S. patent application Ser. No. 12/768,661, filed Apr. 27, 2010, and which claims the benefit of U.S. Provisional Patent Application No. 61/178,636, filed May 15, 2009, and from U.S. Provisional Patent Application No. 61/173,371, filed Apr. 28, 2009, the contents of all of which are hereby incorporated in their entirety by reference for all purposes.

BACKGROUND

As methods and devices for engaging in financial transactions have increased, old problems such as fraud and counterfeiting persist.

One of the primary sources of fraud, which is prevalent in the credit card industry, is skimming. Skimming refers to the electronic copying of a card's magnetic stripe data to create counterfeit cards.

Skimming is predominantly a phenomenon afflicting static magnetic stripe based transactions. This is because the magnetic stripe, which is placed on the back of a transaction card and stores a variety of data on three separate tracks, is a passive medium. In other words, the digital content of the magnetic stripe can be perfectly copied, without any difference between the copy and the original.

One of the primary means by which skimming can be prevented is for the consumer to closely monitor the whereabouts of his transaction card. This may allow the consumer to prevent the card from being swiped through inappropriate devices. However, as contactless cards evolve, the classic skimming problem comes along with it when using static data. In fact, in a wireless environment, the opportunity to skim magnetic stripe data is more prevalent. In a wireless environment, a potential skimmer need not physically possess the card to be skimmed nor have access to any of the physical equipment (e.g. POS terminal, communication lines, etc.) which is required for skimming in a wire-based environment. A skimmer can, without the knowledge of the consumer or merchant, intercept the wireless transaction and copy the data being transmitted from the card to POS terminal.

To address the above problems, a dCVV or a dynamic card verification value can be used. For example, various systems and methods for generating dCVVs are discussed in U.S. patent application Ser. No. 10/642,878 entitled "Method and System for Generating a Dynamic Verification Value" filed on Aug. 18, 2003, and in U.S. patent application Ser. No. 11/764,376 entitled "On-Line Payment Transactions" filed on Jan. 29, 2008. Both of these applications are hereby incorporated in their entirety for all purposes.

In addition to generating a dCVV, a dCVV can be more effective for preventing fraud when it is securely received by a consumer. However, securely receiving and using a dCVV cannot overly interfere with a consumer's experience conducting a transaction. A consumer might not use the dCVV or a consumer might conduct fewer transactions if the inconvenience of receiving and using a dCVV is too great.

Embodiments of the invention address the above problems, and other problems, individually and collectively.

SUMMARY

Embodiments of the invention are directed to methods, systems, and computer program products pertaining to obtaining, providing, and using dynamic card verification values for portable consumer devices.

One exemplary embodiment of the invention is directed to a method of providing a device verification value for a portable consumer device. The exemplary method comprises receiving, at a server, a request for a device verification value for a portable consumer device associated with a user; obtaining, at the server, a datum indicative of a device verification value for a portable consumer device; and sending, from the server, the datum to at least one of a phone number or network address of a personal communication device associated with the user.

Another exemplary embodiment of the invention is directed to a server for providing device verification values for portable consumer devices. The server comprises a data processor, a networking facility coupled to the processor, a computer-readable medium coupled to the processor, and a plurality of codes embodied on (e.g., stored in) the computer readable medium. A first exemplary code directs the data processor to receive a request for a device verification value for a portable consumer device associated with a user. A second exemplary code directs the data processor to obtain a datum indicative of a device verification value for a portable consumer device. A third code directs the data processor to send the datum to at least one of a phone number or network address of a personal communication device associated with the user.

Another exemplary embodiment of the invention is directed to a computer program product embodied on a tangible computer-readable medium that directs a data processor to provide device verification values for portable consumer devices. The exemplary computer program product comprises a first code that directs the data processor to receive a request for a device verification value for a portable consumer device associated with a user; a second code that directs the data processor to obtain a datum indicative of a device verification value for a portable consumer device; and a third code that directs the data processor to send the datum to at least one of a phone number or network address of a personal communication device associated with the user.

Another exemplary embodiment of the invention is directed to a method of providing a device verification value for a portable consumer device. The exemplary method comprises receiving, at a server, a request for a device verification value for a portable consumer device associated with a user, the request originating from a personal communication device associated with the user; obtaining, from the received request, a phone number or network address of the personal communication device from which the received request was originated; obtaining an account record that contains the obtained phone number or network address, the account record associating a consumer account of a portable consumer device with the obtained phone number or network address; obtaining a datum indicative of a device verification value for the consumer account of the obtained account record; and sending the obtained datum to at least one of a phone number or network address of a personal communication device associated with the consumer account of the obtained account record.

Another exemplary embodiment of the invention is directed to a server for providing device verification values for portable consumer devices. The server comprises a data processor, a networking facility coupled to the processor, a computer-readable medium coupled to the processor, and a plurality of codes embodied on (e.g., stored in) the computer readable medium. A first code directs the data processor to receive a request for a device verification value for a portable consumer device associated with a user, the request originating from a personal communication device associated with the user. A second code directs the data processor to obtain, from the received request, a phone number or network address of the personal communication device from which the received request was originated. A third code directs the data processor to obtain an account record that contains the obtained phone number or network address, the account record associating a consumer account of a portable consumer device with the obtained phone number or network address. A fourth code directs the data processor to obtain a datum indicative of a device verification value for the consumer account of the obtained account record. A fifth code directs the data processor to send the obtained datum to at least one of a phone number or network address of a personal communication device associated with the consumer account of the obtained account record.

Another exemplary embodiment of the invention is directed to a computer program product embodied on a tangible computer-readable medium that directs a data processor to provide device verification values for portable consumer devices. The computer program product comprises: code that directs a data processor to receive a request for a device verification value for a portable consumer device associated with a user, the request originating from a personal communication device associated with the user; code that directs the data processor to obtain, from the received request, a phone number or network address of the personal communication device from which the received request was originated; code that directs the data processor to obtain an account record that contains the obtained phone number or network address, the account record associating a consumer account of a portable consumer device with the obtained phone number or network address; code that directs the data processor to obtain a datum indicative of a device verification value for the consumer account of the obtained account record; and code that directs the data processor to send the obtained datum to at least one of a phone number or network address of a personal communication device associated with the consumer account of the obtained account record.

Another exemplary embodiment of the invention is directed to a method of providing a device verification value for a portable consumer device. The exemplary method comprises: receiving, at a server, a request for a device verification value for a portable consumer device associated with a user; obtaining, from the received request, a unique identification code assigned to the user; obtaining an account record that contains the obtained unique identification code, the account record associating a consumer account of a portable consumer device with the obtained unique identification code, the consumer account having an account number associated with it that identifies the consumer account within a payment processing network, the obtained unique identification code being different from the account number of the consumer account of the obtained account record; obtaining a datum indicative of a device verification value for the consumer account of the obtained account record; and sending the obtained datum to at least one of a phone number or network address of a personal communication device associated with the consumer account of the obtained account record.

Another exemplary embodiment of the invention is directed to a server for providing device verification values for portable consumer devices. The server comprises a data processor, a networking facility coupled to the processor, a computer-readable medium coupled to the processor, and a plurality of codes embodied on (e.g., stored in) the computer readable medium. A first code directs the data processor to receive a request for a device verification value for a portable consumer device associated with a user. A second code directs the data processor to obtain, from the received request, a unique identification code assigned to the user. A third code directs the data processor to obtain an account record that contains the obtained unique identification code, the account record associating a consumer account of a portable consumer device with the obtained unique identification code, the consumer account having an account number associated with it that identifies the consumer account within a payment processing network, the obtained unique identification code being different from the account number of the consumer account of the obtained account record. A fourth code directs the data processor to obtain a datum indicative of a device verification value for the consumer account of the obtained record. A fifth code directs the data processor to send the obtained datum to at least one of a phone number or network address of a personal communication device associated with the consumer account of the obtained account record.

Another exemplary embodiment of the invention is directed to a computer program product embodied on a tangible computer-readable medium that directs a data processor to provide device verification values for portable consumer devices. The computer program product comprises: code that directs a data processor to receive a request for a device verification value for a portable consumer device associated with a user; code that directs the data processor to obtain, from the received request, a unique identification code assigned to the user; code that directs the data processor to obtain an account record that contains the obtained unique identification code, the account record associating a consumer account of a portable consumer device with the obtained unique identification code, the consumer account having an account number associated with it that identifies the consumer account within a payment processing network, the obtained unique identification code being different from the account number of the consumer account of the obtained account record; code that directs the data processor to obtain a datum indicative of a device verification value for the consumer account of the obtained record; and code that directs the data processor to send the obtained datum to at least one of a phone number or network address of a personal communication device associated with the consumer account of the obtained account record.

Another exemplary embodiment of the invention is directed to a method of obtaining and using a device verification value for a portable consumer device. The exemplary method comprises: sending, using a personal communication device, a message to a provision entity requesting a device verification value for a consumer account, the consumer account having an account number that identifies the consumer account within a payment processing network, the message comprising at least one of a code phrase or identification code that is different from said account number; receiving, at the personal communication device, a device verification value for the consumer account; and providing information related to the consumer account to a merchant for a transaction with the merchant, the information including the received device verification value.

Another exemplary embodiment of the invention is directed to a method of obtaining and using a device verification value for a portable consumer device. The exemplary method comprises: sending, using a personal communication device, a message to a provision entity requesting a device verification value for a consumer account, the consumer account having an account number that identifies the consumer account within a payment processing network, the message comprising an incomplete part of said account number; receiving, at the personal communication device, a device verification value for the consumer account; and providing information related to the consumer account to a merchant for a transaction with the merchant, the information including the received device verification value.

Other exemplary embodiments of the invention are directed to computer program products embodied on tangible computer-readable medium that direct a personal communications device to send a request for a device verification value for a portable consumer device to a server that provides device verification values. Yet other embodiments are directed to personal communication devices that have these computer program products.

Other exemplary embodiments of the invention are directed to method of providing a device verification value in a transaction notification message. Such a method may comprise: (a) receiving, at a server, a first message comprising transaction information and an identifier that identifies a user or a consumer account of a user; (b) obtaining the identifier from the first message; (c) obtaining an account record that contains the obtained identifier, the account record associating a consumer account of a portable consumer device with the obtained identifier, and at least one of a phone number or network address of a personal communication device with the obtained identifier; (d) obtaining a datum indicative of a device verification value for the consumer account of the obtained account record; (e) generating a second message that includes the obtained datum and at least a portion of the transaction information of the first message; and (f) sending the second message to at least one of a phone number or network address of a personal communication device associated with the consumer account of the obtained account record.

Other exemplary embodiments of the invention are directed to computer program products embodied on tangible computer-readable media that can provide a device verification value in a transaction notification message. Such a method may comprise: code that directs a data processor to receive a first message, the first message comprising transaction information and an identifier that identifies a user or a consumer account of a user; code that directs the data processor to obtain the identifier from the first message; code that directs the data processor to obtain an account record that contains the obtained identifier, the account record associating a consumer account of a portable consumer device with the obtained identifier, and at least one of a phone number or network address of a personal communication device with the obtained identifier; code that directs the data processor to obtain a datum indicative of a device verification value for the consumer account of the obtained account record; code that directs the data processor to generate a second message that includes the obtained datum and at least a portion of the transaction information of the first message; and code that directs the data processor to send the second message to at least one of a phone number or network address of a personal communication device associated with the consumer account of the obtained account record.

Further details regarding embodiments of the invention are provided below in the Detailed Description with reference to the Figures.

BRIEF DESCRIPTION OF THE DRAWINGS

FIG. 2 shows a diagram of an exemplary user account record according to various embodiments.

FIG. 4 shows a block diagram illustrating the components of various personal communication devices useable with various embodiments.

DETAILED DESCRIPTION

Figure 1:
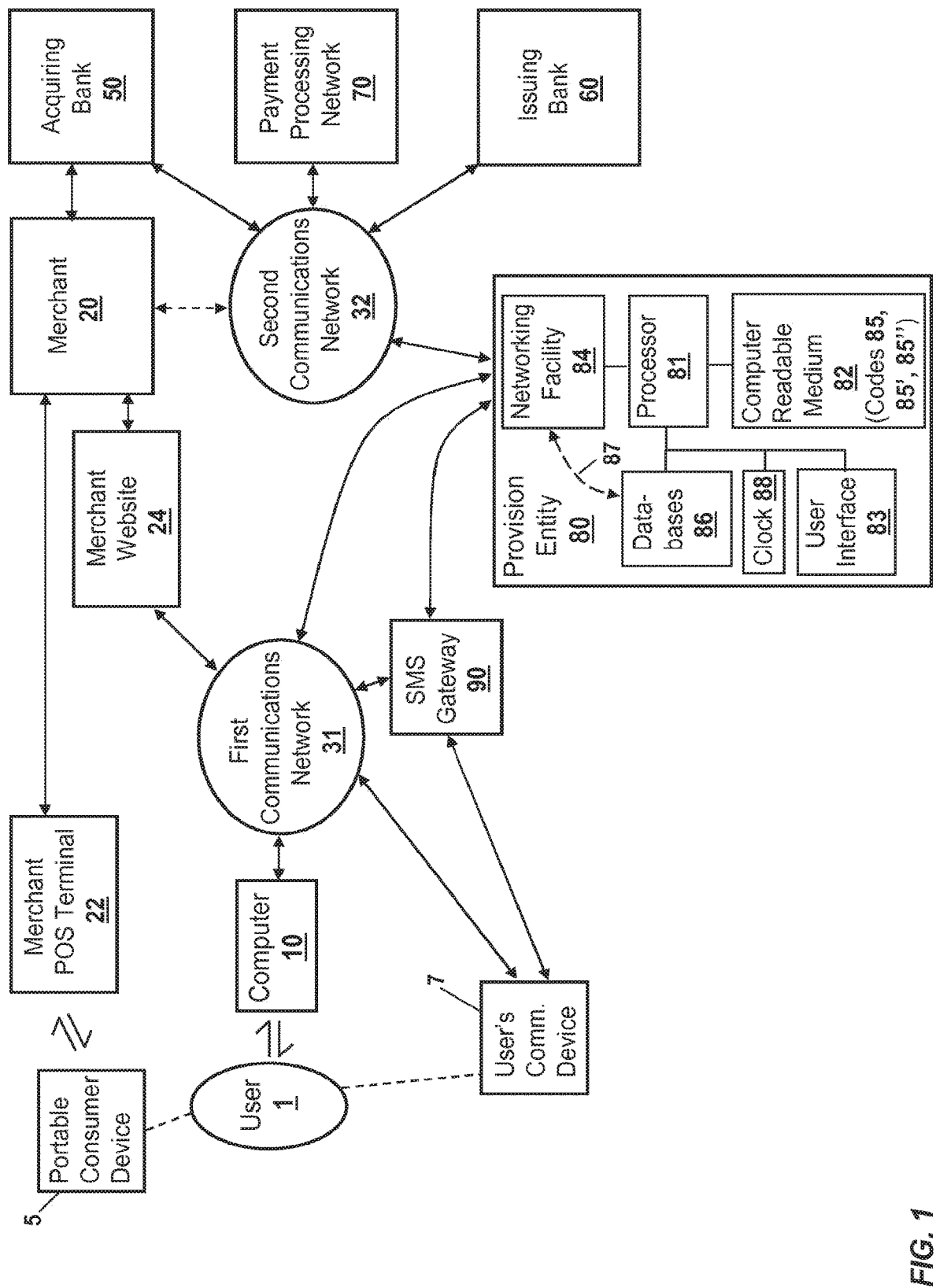
FIG. 1 shows a block diagram illustrating the components of various systems according various embodiments.

Embodiments of the present invention are able to maintain or improve existing user experiences, minimize the impact on merchant processes/systems, leverage existing network data transport mechanisms, utilize existing issuer validation infrastructure, support multiple forms of implementation, and maintain consistency with broader authentication strategy.

Generally, embodiments of the present invention pertain to methods, systems, and computer-program products of generating dynamic card verification values, referred to herein as the "dCVV" values, for portable consumer devices. The dCVV value can be provided along with the payment information of the portable consumer device to increase the confidence that the use of the portable consumer device is authentic and not fraudulent (e.g., not skimmed). The embodiments described below can be applied for both card present and card-not-present (CNP) transactions.

A portable consumer device comprises a device that holds identification information pertaining to an account held by a user with another entity, which is typically an entity that holds, extends, or credits items of value to the user (e.g., monetary funds, credits, debts, etc.). Portable consumer devices encompass credit cards, charge cards, debit cards, bank cards, prepaid cards, access cards, security cards, and other cards that identify an account held by a user with another entity. The cards are capable of existing in both passive forms (e.g., cards with a magnetic stripe) and active forms (e.g., integrated circuit cards, smartcards), and further encompass portable electronic devices that, in whole or in part, function as such cards. Such portable electronic devices can include memory cards, account tokens, fobs, stickers, cellular telephones (including near-field communications phone), keychain devices (such as the Speedpass™ commercially available from Exxon-Mobil Corp.), personal digital assistants, other mobile electronic devices, transponders, smart media, and pagers.

A typical credit card transaction flow using a portable consumer device at a point-of-sales location is described next. The user's portable consumer device is provided to the user by or on behalf of an issuing bank. The issuing bank extends credit to the user, represents the user in credit card transactions, and pays merchants for the purchases made by the user. A user presents his or her portable consumer device to a merchant at a point-of-sales location to pay for an item or service. The merchant uses a reader to read the user's portable consumer device, and sends the payment information read from the device along with merchant's information and the transaction amount to an acquiring bank. The merchant may also read the portable consumer device for the printed card verification value (e.g., the CVV value printed on the backs of many credit cards), and may send this along as part of the transaction information sent to the acquiring bank. The acquiring bank represents, and vouches for, the merchant in credit card transactions. The acquiring bank forwards the transaction information to a payment processing network, such as VisaNet™, for authorization. A payment processing network generally encompasses a collection of one or more data processing server computers, subsystems, networks, and operations used to support and deliver one or more of the following: authorization services, exception file services, and clearing and settlement services. Payment processing networks encompass bank processing networks, credit-card payment processing networks, etc. An exemplary payment processing network may include VisaNet™. Exemplary payment processing networks are able to process one or more of the following: credit-card transactions, debit-card transactions, and other types of commercial transactions. A payment processing network may use any suitable wired or wireless network, including the Internet, to communicate with acquiring banks and issuing banks.

Prior to the occurrence of a credit-card transaction, the payment processing network has established a protocol with each issuing bank on how the bank's transactions are to be authorized. In some cases, such as when the transaction amount is below the threshold value, the payment processing network will authorize the transaction based on information that it has about the user's account without consulting the issuing bank, and will accept the liability if the transaction turns out to be fraudulent. In other cases, such as when the transaction amount is above a threshold value, the payment processing network will forward the transaction information on to the issuing bank for verification and authorization. As part of the authorization process, the payment network or the issuing bank may verify the printed CVV value, which is stored at the issuing bank, and may be securely provided by the issuing bank to the payment processing network for storage and subsequent use. The degree to which the payment processing network is involved in the verification of the consumer portable device and the authorization of the transaction is typically configured according to the wishes of the issuing bank. Once the transaction is authorized, the payment processing network sends an authorization indication to the acquiring bank, which sends the authorization indication on to the merchant. In order to reduce fraud, merchants are not allowed to store printed card verification values (CVVs) for more than 24 hours.

When a user wishes to make an online purchase with a merchant over the Internet, the user types in the credit card account number, cardholder name, expiration date, and the printed CVV value of the portable consumer device into respective fields on the merchant's checkout page. This is the payment information associated with the portable consumer device. When the user confirms the purchase on the merchant's website, the merchant sends payment information along with merchant's information and the transaction amount to the acquiring bank for the merchant. The acquiring bank forwards the transaction information to a payment processing network, such as VisaNet™, for authorization, just as in the point-of-sales example.

In both purchasing environments, there is risk of fraudulent activity through skimming of the payment information. For example, a store clerk can copy down the payment information during a transaction at a point-of-sales location, and can later use the copied information to make an online purchase. As another example, a hacker can install spyware on the user's computer to intercept the payment information, and use it to make fraudulent purchases at other online merchants. Other avenues of potential fraud exist. Embodiments of the invention are directed to mitigating these types of fraudulent activity by replacing the use of the printed CVV value with a dynamically changing value, which may change for each transaction or group of transactions, or may change according to a time schedule, that may be regular or irregular.

FIG. 1 illustrates several exemplary embodiments of the invention in the contexts of both an online purchase and in-store purchase at a point-of-sales (POS) terminal. A general overview description of the embodiments and components shown in the figure will be given, followed by more detailed descriptions. Shown in the figure are icons for a user 1, the user's portable consumer device 5, the user's personal communication device 7 (such as a cell phone), and the user's computer 10. Also shown in the figure are a merchant entity 20, a point-of-sales terminal 22 for merchant 20, a website 24 for merchant 20, and a first communications network 31 that enables the user's computer and the merchant's website to communicate with one another. The first communications network 31 may include the Internet, a telecommunications network (e.g., a wireless network, cell phone network, a telephone network, a cable network, or any combination thereof), a wide area network (WAN), a local area network (LAN), a home router or gateway coupled to one of the above networks, or any combination of the above. Also shown in FIG. 1 is an acquiring bank 50 for the merchant, an issuing bank 60 for the portable consumer device 5, a payment processing network 70, and a second communications network 32 that enables the payment processing network 70 to communicate with each of the banks 50 and 60. The second communications network 32 may comprise the Internet (and therefore may overlap and share facilities with the first communications network 31), or may comprise one or more private networks, or combination of one or more private networks with the Internet. A private network may comprise a telecommunications network, a wide area network (WAN), a local area network (LAN), or any combination thereof. In some instances, the first and second communications networks 31 and 32 may be the same (such as a network using the Internet as the backbone). A communications network generally comprises a network of one or more communications links and two or more nodes that pass messages from one part of the network to another part. Each node comprises one or more pieces of electrical machinery, and each link may comprise one or more of the following: optical fibers, optical links, radio links, electrical wires. The components described so far are, for the most part, conventional and arranged in a conventional manner.

Also shown in FIG. 1 is a provision entity 80 and an SMS gateway 90. SMS gateway 90 provides an interface between personal communications devices 7 and entities that are coupled to communications network 31 so that text messages can be conveyed between communication devices 7 and the entities coupled to network 31. The entities coupled to network 31 include web sites and provision entity 80. Provision entity 80 provides device verification values to user 1 by way of the user's personal communication device 7 under various conditions and/or circumstances, according to various embodiments of the invention as described below. For the sake of clarity, and without loss of generality, we can refer to the device verification value provided by provision entity 80 as a "dCVV2" value, so as to distinguish it from the dynamic "CVC3" and "dCVV" values generated by smartcards, from the printed CVV values on the backs of many credit cards, and from the CVV field found on a checkout page of a typical merchant website. The dCVV2 values may be conveyed to the user's personal communications device 7 by way of SMS gateway 90, or by way of communications network 31. In the former case, provision entity 80 may send dVCC2 values to SMS gateway 90 directly or via communications network 31. In the latter case, personal communications device 7 may be network-capable and may have a network address that is accessible via communications network 31. A network address for personal communications device 7 may comprise any one of: a uniform resource locator (URL), an Internet-protocol address (IP-address), an e-mail address, or any other type of identifier that can identify an entity on a communications network.

The dCVV2 values provided by provision entity 80 for a particular portable consumer device 5 vary with time in some manner. They therefore are dynamic, as opposed to the static nature of a printed CVV value on the back of a credit card. When conducting an in-store purchase, user 1 can provide a received dCVV2 value to the store clerk to be entered in at POS terminal 22 as the card verification value for the transaction. When conducting an on-line purchase, user 1 can enter a received dCVV2 value into the CVV field of the checkout page of merchant website 24. According to various embodiments, the dCVV2 values provided to user 1 by provision entity 80 can be obtained from issuing bank 60 or payment processing network 70, or can be generated by entity 80 and provided to issuing bank 60 and/or payment processing network 70. In each of the configurations, user 1, merchant 20, and the entity that will authorize the transaction, which may be payment processing network 70 and/or issuing bank 60, know the particular dCVV2 value that is to be used for the transaction. Since the dCVV2 values vary with time, a fraudster who intercepts and tries to use a prior dCVV2 value can be thwarted. In this manner, the provision of varying dCVV2 values increases the confidence that the use of the portable consumer device is authentic, and not fraudulent (e.g., not skimmed). The provision of varying dCVV2 values also maintains or improves existing user experiences, minimizes the impact on merchant processes and systems, leverages existing network data transport mechanisms, utilizes existing issuer validation infrastructure, and maintains consistency with broader authentication strategies.

Provision entity 80 can process requests from a plurality of different personal communication devices 7 (e.g., millions of cell phones), and can process any number of requests by a particular personal communication device 7. Provision entity 80 may apply one or more validation tests to the request to obtain a level of confidence that the request is not fraudulent before sending a datum indicative of a dCVV2 value to a requesting device 7. Provision entity 80 comprises a system having one or more servers coupled to a communications network that can receive requests for device verification values. One of the servers of entity 80 is shown in FIG. 1; the server comprises one or more processors 81 electrically coupled to each of a tangible computer-readable medium 82, a user interface 83, one or more databases 86, and a networking facility 84, the latter of which is coupled to first and second communications networks 31 and 32. User interface 83 comprises one or more video output devices (e.g., displays, screens) and one or more input devices (e.g., keyboard, mouse, trackball, etc.), which enable an administrator of entity 80 to receive information from the server and to provide input to the server. Computer-readable medium 82 may comprise a combination of semiconductor memory and non-volatile storage, such as one or more disk drives and/or non-volatile memory.

Computer-readable medium 82 stores an operating system for the server, which enables processes and applications to be run by processor(s) 81, and enables codes for directing the operation of processor(s) 81 to be run. Computer-readable medium 82 also stores a plurality of codes that direct processor(s) 81 to perform various tasks to process requests for dCVV2 values and to provide datum indicative of dCVV2 values. The codes and tasks can vary among the various sets of embodiments described herein, and are described in greater detail below with the description of each set of embodiments. The operating system provides services to these processes, applications, and codes, and enables them to access components of user interface 83, portions of computer-readable medium 82, networking facility 84, databases 86, and other components of entity 80. Specifically, the operating system provides one or more I/O communications modules that enable processor(s) 81 to communicate with user interface 83 and databases 86. Each I/O communications module has an application programming interface (API) with a collection of functions that a processor 81 can call in order to access the components. The operating system of entity 80 also comprises one or more network services modules that can access networking facility 84 and set up communication sessions to entities on communications networks 31 and 32, and with SMS gateway 90. Such network services modules include Microsoft's Windows Communications Foundation (e.g., .NET 3.0, .NET 4.0, etc.), Apple's CFNetwork Framework, the networking section of the Unix and Linux operating system kernels, and the OS Services Layer and the Base Services Layer of the Symbian operating system, and the like. Each of these network services modules is non-exclusive (e.g., capable of serving more than one processor and more than one process/application) and provides an application programming interface (API), which has a collection of functions that a processor 81 can call in order to manage communications with another entity. With these API facilities, a collection of function calls can be readily constructed for a processor to execute that enables the processor to establish a communications channel with an entity on a communications network coupled to networking facility 84, and to exchange messages and data with the entity. The above operating system, modules, and APIs all include instructions that direct the operation of processor(s) 81.

One or more databases 86 may be configured as database servers, which processor(s) 81 can access via networking facility 84 over a private communications network 87, which is illustrated by the dashed line in FIG. 1. Provision entity 80 conventionally has a clock 88 for tracking time and dates for various applications. Clock 88 may be a simple counter of seconds, or fractions thereof, that can be read by processor 81 by an I/O operation, or may comprise a more complex arrangement of hardware or firmware that can provide the various components of the current date and time (year, month, day, hour, minute, and second) in various registers that can be read by processor 81 through the execution of one or more I/O operations.

In a first set of embodiments, user 1 creates a management account with provision entity 80, or an associate thereof, such as issuing bank 60 or payment network 70. In some configurations, provision entity 80 may be part of issuing bank 60 or part of payment processing network 70. With the management account, the user can associate the consumer accounts (e.g., account numbers and related information) of one or more corresponding portable consumer devices 5 with a mobile phone number and/or network address of personal communications device 7. The account number of consumer account identifies the consumer account within at least one payment processing network, and may comprise a primary account number (PAN). The associations specified in the management account are stored as an account record in a database 86 of entity 80. If the management account is set up with issuing bank 60 or payment processing network 70, the association of the consumer accounts of one or more portable consumer devices 5 with a mobile phone number and/or network address provided in the management account is securely transmitted to provision entity 80 over communications network 32, and is stored as an account record in a database 86 of entity 80. This database 86 of account records enables provision entity 80 to find the consumer accounts (e.g., account numbers and related information) of the user's portable consumer devices 5 based on the mobile phone number or network address of the user's personal communication device 7.

An exemplary embodiment of an account record in the aforementioned database 86 is shown in FIG. 2. The exemplary account record is embodied on a computer-readable medium and comprises three data fields (shown as the top row of the record) to store a mobile phone number, a network address, and a unique identification code for user 1. All three of these data fields are indexed and searchable. The data fields for the mobile phone number and network address are to store the mobile phone number (if available) and network address (if available) of the user's personal communications device 7. At least one of these fields is filled. If device 7 does not have both a mobile phone number and a network address, then one of the fields is filled with a NULL indicator. The third data field holds a unique identification code that is uniquely assigned to the user by provision entity 80 (or an affiliated entity) upon enrollment, such as during the creation of the user's management account. The next three rows in the account record shown in FIG. 2 hold data fields for three example consumer accounts for user 1, which the user has associated with the mobile phone number and/or network address provided in the data fields of the first row. The first data field (e.g., "Consumer Account A") holds information about the consumer account, such as the identity and contact information of the issuing bank, and such as the conditions of use of the account (e.g, expiration date). The second data field (e.g., "Account Number for Account A") holds the account number for the consumer account, such as a 16-digit number of a credit-card consumer account. The third data field (e.g., "Code phrase for Account A") holds a code phrase (e.g., a text string of alphanumeric characters) that user 1 provides to identify the consumer account without referring to the account number for the consumer account (the code phrase is different from the account number). The fourth data field stores an indication of which route the dCVV2 value is to be conveyed back to user 1 (Reply Route data field). This indication may be set to any of the following values: (1) the dCVV2 value is to be sent to the mobile phone number given in the account record, (2) the dCVV2 value is to be sent to the network address given in the account record, (3) the dCVV2 value is to be sent to both the mobile phone number and the network address given in the account record, (4) the dCVV2 value is to be sent back to the source of the request message, (5) the dCVV2 value is to be sent back to the opposite of the request message (e.g., sent to mobile phone number if the request was sent from the network address). The fifth data field indicates the method to be used to obtain the dCVV2 value, and may include one or more actual dCVV2 values to use, or an algorithm and any associated parameters to use to generate dCVV2 values. The sixth data field holds various parameters for the consumer account, such as a status designation that indicates whether the account is the primary account, and which validation tests, if any, are to be applied to dCVV2 requests for the consumer account. The sixth data field can also hold an indication of whether an e-mail will be sent to the user's e-mail address under one or more of the following conditions: when a dCVV2 value is requested, when a dCVV2 value is sent, when a request for the dCVV2 value is denied.

To enable user 1 to set up a management account, provision entity 80 or an affiliated entity (e.g., issuing bank or payment processing network) may comprise a website accessible to the user 1 that enables the user: (1) to create a password-protected management account; (2) to associate an e-mail address with the management account to receive messages and alerts; (3) to associate a mobile number and/or URID (e.g., network address) of the user's personal communications device 7 to be used to receive dCVV2 values; (4) to associate one or more consumer accounts and corresponding account numbers of the user's one or more corresponding portable consumer devices 5; and (5) to associate a code phrase and reply route with each consumer account, and to activate the sending of an e-mail to the user's e-mail address when a dCVV2 value is requested and/or sent or denied, as indicated above. One of databases 86 may be assigned to hold the management accounts of the users. Code associated with the website can direct the processor of the entity to create an account record shown in FIG. 2 for the user by copying the data from the management account into the corresponding data fields of the account record, by assigning a unique identification code to the user and copying it to the corresponding data field of the account record, and by contacting the issuing bank for each consumer account to get the method for obtaining dCVV2 values for the consumer account and copying the method to the corresponding data field of the account record. Thereafter, when provision entity 80 receives a request for a dCVV2 value, it can query the database of account records for the user's account record using the mobile phone number or network address of the user's personal communications device 7, and determine the consumer accounts of the portable consumer devices 5 that are associated with the user's personal communication device 7. The above codes and actions can be implemented with HTML page codes, XML page codes, and the like (e.g., web pages), conventional I/O instructions, memory access instructions, database function calls, CPU arithmetic instructions, CPU logic instructions, and CPU control instructions. In view of this disclosure, the codes may be implemented by one of ordinary skill in the software art without undue experimentation.

As one approach for requesting a dCCV2 value, when user 1 wishes to complete an on-line or in-store purchase, user 1 can send a request in the form of a text message from personal communication device 7 to a short mobile code (e.g., 5 digit number) or long mobile code (e.g., 10 digit number) associated with provision entity 80. The body of the text message may be blank or may contain a code phrase for portable consumer device 5 or a selected number of digits of the account number for portable consumer device 5 (e.g., incomplete account number). The protocol of the text message, which is separate from the body of the text message and which typically includes the header of the text message, includes the mobile phone number of personal communications device 7. The text message is received by an SMS gateway 90, which may be operated by the service provider for communications device 7. Looking at the received mobile code, SMS gateway 90 determines that the text message is to be forwarded to provision entity 80, and forwards the text message to entity 80 via communications network 31 using a uniform resource identifier (URID) for entity 80. (A URID may comprise a uniform resource locator (URL), an Internet-protocol address (IP-address), an e-mail address, or any other type of identifier or network address that can identify an entity on a communications network.) Prior to this, the short code, long code, and URID for entity 80 may be provided to SMS gateway 90. SMS gateway 90 performs any needed conversion of the message format for the text message, and includes the mobile phone number in the body and/or protocol (e.g., header) of the message going to entity 80. SMS gateway 90 may encrypt the message with a key provided by provision entity 80. The Short Message Peer-to-Peer protocol (SMPP) may be used to route the message from gateway 90 to provision entity 80 over communications network 31, and methods of converting to and from the SMP and SMPP message formats are well known to the art. In addition, SMS gateway 90 and its routing operations are known to the art and are commercially available. In some implementations, SMS gateway 90 may be coupled to networking facility 84 of provision entity 80 with a direct connection, and may communicate with provision entity 80 without the need to use first communications network 31.

As another communication approach, personal communications device 7 may be network-enabled, having its own network address, and may send the request message directly to provision entity 80 by way of communications network 31. The message may be sent by any number of well known Internet protocols, such as User Datagram Protocol (UDP), Datagram Congestion Control Protocol (DCCP), Stream Control Transmission Protocol (SCTP), and Transmission Control Protocol (TCP), each of which includes the network address of device 7 in the message protocol (e.g., the message header, or packet header).

Figure 3:
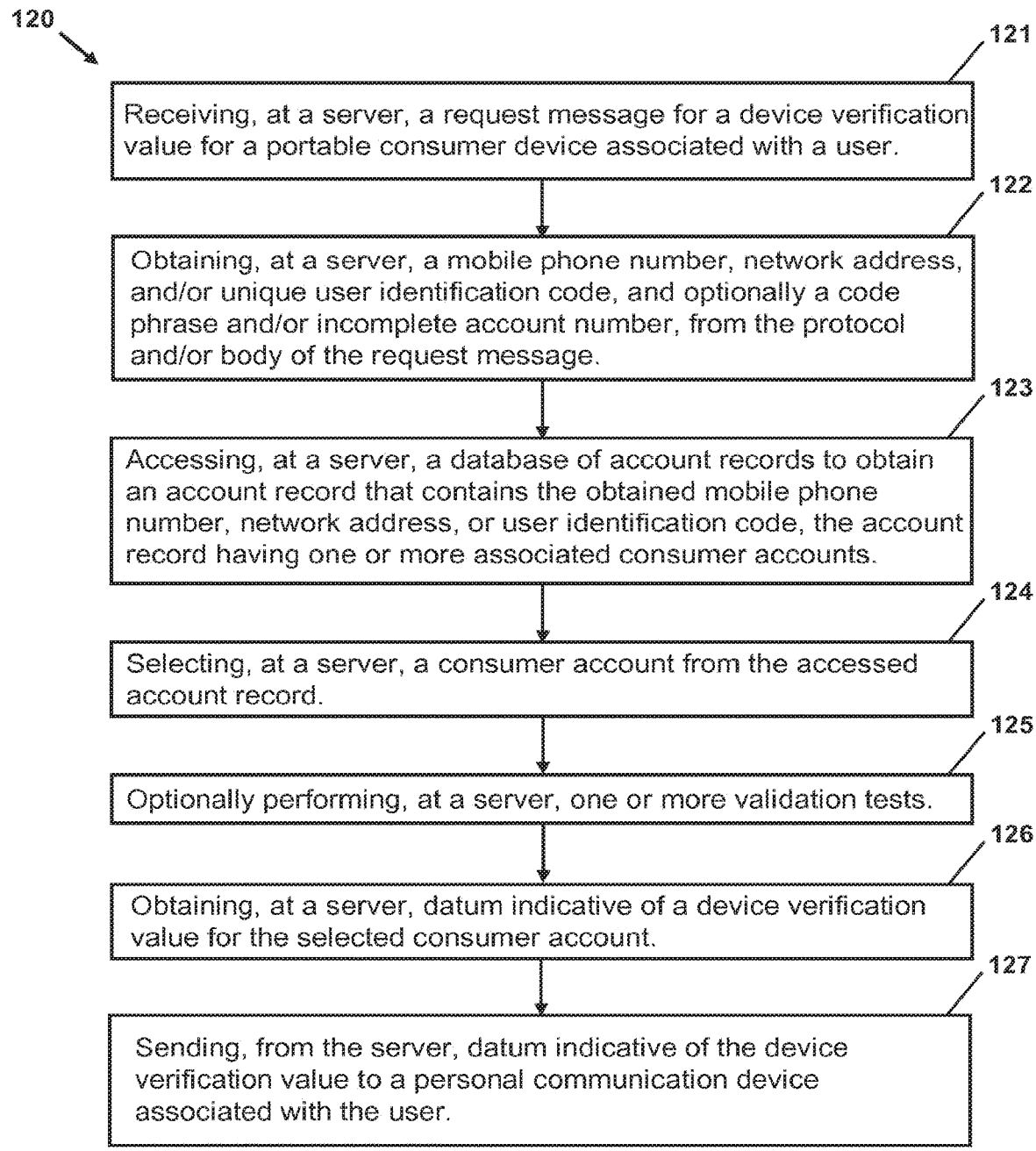
FIG. 3 shows a flow diagram illustrating general actions of various method embodiments.

The various actions occurring at provision entity 80 are illustrated in the method flow diagram 120 shown in FIG. 3. Once provision entity 80 receives the request message from SMS gateway 90 or from communication device 7 via network 31 (action 121 shown in FIG. 3), it obtains the mobile phone number or network address of communications device 7 from the protocol of the message (e.g., message header) or the body of the message, and obtains a code phrase (if present) or any digits of the account number associated with portable consumer device 5 from the body of the message (if present), as illustrated in action 122 shown in FIG. 3. It then accesses, as illustrated by action 123 in FIG. 3, the database 86 of account records to locate and obtain an account record that contains the obtained mobile phone number, network address, or unique user identification code, the account record having one or more consumer accounts of portable consumer devices that have been associated with the obtained mobile phone number, network address, or user identification code, as described above. In one embodiment, this database 86 may store the account records of all the users 1 that can request dCVV2 values from provision entity 80. As indicated above, each account record is indexed by mobile phone numbers, network addresses, and user identification codes, and can be located by phone number, network address, and user identification code (e.g., the database is searchable based on these datum). Each account record also contains information pertaining to the method of how the dCVV2 values for each consumer account are to be obtained (e.g., generated). In this manner, provision entity 80 can obtain all of the consumer accounts and account numbers of the portable consumer devices 5 that are associated with the mobile phone number or network address of personal communications device 7 that sent the request for the dCVV2 value, and information on how the dCVV2 values are to be obtained.

If a code phrase or an account number (or portion thereof) is present in the request message, provision entity 80 may be configured to find a match of this code phrase or account number (or portion thereof) to a code phrase or account number (or portion thereof) stored in the accessed and obtained account record. If no match is found, provision entity 80 may be configured to take no further action, or to send an error message in the form of a text message back to communications device 7 via SMS gateway 90 or communications network 31. If a match is found, provision entity 80 can select the consumer account for which the match was found, and can then access the data field that stores the dCCV2 method for the selected consumer account (action 124 shown in FIG. 3). If an account number, incomplete account number, and code phrase were not obtained from the request message, then provision entity 80 can examine the parameters data fields of the account record (shown in FIG. 2) to see if one of the consumer accounts is indicated as being the primary consumer account for the user. If so, provision entity 80 can select the primary consumer account and access its data field that stores the dCCV2 method for the account (action 124 shown in FIG. 3). As another option for the case when the dCVV2 request message does not contain an account number, incomplete account number, or code phrase, provision entity 80 may be configured to take no action or to send an error message in the form of a text message back to communications device 7.

Provision entity 80 may then obtain a datum indicative of a dCVV2 value for the selected consumer account using information from the above-mentioned data field that stores the dCCV2 method for the selected consumer account (action 126 shown in FIG. 3). The obtained datum may be the dCVV2 value itself, an encoded form of the dCVV2 value, or an indication of a methodology to use to generate the dCVV2 value at the user's personal communication device 7. Exemplary methods of obtaining datum of dCVV2 values are described below in greater detail.

To enhance security of the service, the full account number of the user's portable consumer device 5 is not transmitted to entity 80 in the request message. Instead, only the code phrase or a small portion of the account number (e.g., an incomplete account number) of the user's portable consumer device 5 is transmitted. This prevents an eavesdropping fraudster from intercepting the complete account number and using the information in another financial channel. In this regard, the transmission of the mobile phone number or network address of device 5, and the action of locating the consumer account in a secure database 86 of provision entity 80 as described above, is significantly more secure than the case of transmitting the complete account number.

The above-described finding of a match by provision entity 80 between the code phrase or account number (or portion thereof) obtained from the request message and a code phrase or account number stored in the obtained account record serves as a first validation test that helps to ensure that the request for the dCVV2 value has not been spoofed by a fraudster. As a second validation test, provision entity 80 may check the mobile phone number or network address obtained from the received request message against one of its databases 86 that tracks mobile phone numbers and network addresses that have been used in fraudulent activities. If the obtained mobile phone number or network address is found in the database, provision entity 80 does not send the dCVV2 value. As a third validation test, provision entity 80 may check the matched consumer account against one of its databases 86 that tracks consumer accounts that have been used in fraudulent activities. If the matched consumer account is found in this database, provision entity 80 does not send the dCVV2 value.

As another security measure, the dCVV2 request message may include the user's unique identification code (which may comprise a number or alphanumeric name). The unique identification code is different from each of the account numbers (e.g., PANs) of the user's portable consumer devices 5 and corresponding consumer accounts. As a fourth validation test, provision entity 80 may compare the identification code received in the request message against the unique identification code stored in the account record that entity 80 has for the user (which has been located by the mobile phone number or network address obtained from the request message). This validation test is passed if the received code matches the stored code, and failed if the two codes do not match. It may be appreciated that the account records in database 86 may be indexed by the unique identification codes so that provision entity 80 can find the consumer accounts of the user's devices 5 according to the identification code provided in the dVCC2 request message sent by the user. In this case, as a corresponding validation test, provision entity 80 may compare the mobile phone number or network address obtained from the request message to the mobile phone number or network address stored in the account record that entity 80 has for the user. This validation test is passed if the obtained phone number or network address code matches a phone number or network address stored in the account record.

As a fifth validation test for request messages sent via SMS messaging, provision entity 80 may obtain the network address (e.g., IP-address) of the SMS gateway 90 that sent the dCVV2 request message, and compare the obtained network address to a list of trusted SMS gateways for a match. If a match is found, the validation test is passed; otherwise the test is failed. The network address of SMS gateway 90 is provided in the protocol information, such as header information, in the request message sent from the SMS gateway.

Typically, one or more of the validation tests are preformed in accordance with the desired level of security, but it is not necessary to perform any or all of the tests. The optional performance of the validation tests is indicated at action 125 in FIG. 3, which can occur before or after the action of obtaining the dCVV2 datum. If a selected set of validation tests are passed, provision entity 80 may send the datum of the dCVV2 value in a response text message to the network address of personal communications device 7 and/or to the mobile phone number of device 7 via SMS gateway 90, which may be determined by the data in the Reply Route data field of the account record (shown in FIG. 2) for the selected consumer account. This action is shown at 127 in FIG. 3. To thwart snooping by fraudsters, the datum of the response message may send the dCVV2 value in encoded form, such as with a selected number of dummy digits being added before and/or after the dCVV2 value, with user 1 being advised beforehand on which digits to select for the dCVV2 value (and which digits are the dummy digits). The datum may also comprise an indication of a methodology for user 1 to use to generate the dCVV2 value at the user's personal communication device 7, such as indications of a row and column of a table of dCVV2 values for the user to look up. The dCVV2 request message from device 7 and the response message from entity 80 may be sent in the same communications route (e.g., both routed as SMS messages through SMS gateway 90, or both directly routed as network messages through communications network 31 using network addresses), or may be sent by different communication routes (e.g., one message send via SMS gateway 90, the other sent directly through communications network 31). Finally, provision entity 80 may examine the parameters data field of the accessed account record to determine if there is any indication that one or more alerts are to be sent by e-mail to the user's e-mail account. If the parameters data field has an indication that an alert is to be sent if a request for a device verification value has been made, and such a request has in fact been made, provision entity 80 sends an alert message by e-mail to the user's e-mail account indicating the time and date that a request for device verification value has been made, and optionally providing an indication of the consumer account on which the request was made. If the parameters data field has an indication that an alert is to be sent if a device verification value has been sent, and if the value has actually been sent, provision entity 80 sends an alert message by e-mail to the user's e-mail account indicating the time and date that a device verification value was sent, and optionally providing an indication of the consumer account for which the value was intended. If the parameters data field has an indication that an alert is to be sent if a request for a device verification value has been denied, and such a request has in fact been denied (such as for failing one or more validation tests), provision entity 80 sends an alert message by e-mail to the user's e-mail account indicating the time and date that a request for device verification value was made and/or denied, and optionally providing an indication of the consumer account on which the request was denied. If the user has elected that two or more of the above alerts be generated, the alerts may be combined into a single e-mail message.

To implement the above embodiments, computer-readable medium 82 may store an application 85 having the following codes embodied thereon. A first code directs processor(s) 81 to receive a request message from personal communication device 7 (via network 31) and/or from SMS gateway 90 for a device verification value for a portable consumer device associated with a user, the request originating from personal communication device 7 associated with user 1 as described above. A second code directs processor(s) 81 to obtain and place in temporary memory storage the following data from the request message: the network address or phone number of the personal communication device 7 that originated the request message, the network address of the SMS gateway 90 that sent the request message if the request was sent via the SMS route, digits of an account number (if present) in the body or header of the message, a code phrase (if present) in the body or header of the message, and a user identification code (if present) in the body or header of the message. The first and second codes may comprise function calls to the network services module of the operating system and conventional I/O instructions to networking facility 84, memory access instructions, CPU logic instructions, and CPU control instructions. A third code directs processor(s) 81 to obtain an account record of user 1 that contains the mobile phone number or network address obtained from the request message, the account record having one or more consumer accounts of portable consumer devices that have been associated with the obtained network address or mobile phone number, as described above. The third code may comprise conventional I/O instructions or function calls to one of databases 86 that holds the account records (e.g., a function call directly to the database or via networking facility 84), memory access instructions, and CPU control instructions.

A fourth code of application 85 directs processor(s) 81 to select a consumer account from the obtained account record. This code may direct the data processor(s) 81 to compare the account number, incomplete account number, or code phrase obtained from the request message to the account number(s) and/or code phrase(s) stored in the account record to find a matching item. The data processor selects the consumer account with the matched item as the selected consumer account. If an account number, incomplete account number, and code phrase were not obtained from the request message, then the fourth code may direct data processor(s) 81 to examine the parameters data fields of the account record to see if one of the consumer accounts is indicated as being the primary consumer account for the user. If so, the code directs data processor(s) 81 to select the primary consumer account as the selected consumer account. The fourth code may comprise conventional memory access instructions, CPU logic instructions, and CPU control instructions.

A fifth code directs processor(s) 81 to obtain a datum indicative of a device verification value for the selected consumer account (e.g., for the portable consumer device). In some implementations, the fifth code may include directing the processor(s) 81 to identify, from information in the obtained account record, the method to be used to obtain the datum of the dCVV2 value for the selected consumer account, and to execute the identified method. As indicated above, this information may be stored in the dCVV2 method data field for the selected consumer account, as shown in FIG. 2. This data field may contain parameters to be used in the method, and the fifth code may direct processor(s) 81 to read and use the parameters in the execution of the method. In other implementations, an application different from application 85 may pre-store one or more dCVV2 values in the dCVV2 method data fields of the consumer accounts, and the fifth code of application 85 may read the dCVV2 method data field for a dCVV2 value to use. This other application may update the dCVV2 values in these data fields according to a selected time schedule, and optionally in consultation with the issuing banks, to keep the values dynamic. In yet other implementations, the fifth code may direct processor(s) 81 to execute a common method to generate the dCVV2 value, where the common method is applied to all account records handled by provision entity 80, or to all of the account records for devices issued by a given issuing bank. The common method may include, as inputs, parameters specific to the user or the selected consumer account, as read from the obtained account record. The fifth code may further instruct data processor(s) 81 to send the obtained dCVV2 value to payment processing network 70 and/or issuing bank 60 (e.g., an entity different from personal communications device 7), along with an indication of the selected consumer account (e.g., the account number). In view of this disclosure, the fifth code can be implemented with conventional I/O instructions, function calls to databases, memory access instructions, CPU arithmetic instructions, CPU logic instructions, and CPU control instructions. Aspects of various implementations of the fifth code are described below in greater detail.

A sixth code directs processor(s) 81 to send a fulfillment message having the datum of the dCVV2 value back to the network address or mobile phone number of device 7, the latter being routed through SMS gateway 90. For these actions, the processor can be directed to use the network address or mobile phone and URID (e.g., the network address) of SMS gateway 90 that processor(s) 81 had previously stored under the direction of the first and second codes. In other implementations, the sixth code may direct processor(s) 81 to read the Reply Route data field for the selected consumer account (shown in FIG. 2) to determine which route(s) to use, and to then use network address and/or mobile phone number stored in the obtained account record. The sixth code may further direct processor(s) 81 to include in the fulfillment message a representation of the consumer account for which the dCVV2 value is being provided. The representation may comprise the incomplete account number or code phrase that was sent in the request message, or may include a different representation. The sixth code may comprise function calls to the network services module of the operating system and conventional I/O instructions to networking facility 84, memory access instructions, CPU logic instructions, and CPU control instructions.

An optional seventh code directs processor(s) 81 to perform the above-described second validation test prior to the execution of one or both of the above-described fifth and sixth codes. The seventh code directs the processor(s) to access one of databases 86 that tracks mobile phone numbers and network addresses that have been used in fraudulent activities to determine if the mobile phone number or network address provided in the request message is found in the accessed database. If it is found, the seventh code directs the processors(s) to not execute the sixth code, and optionally to not execute either or both of the fourth and fifth codes. The seventh code may comprise conventional I/O instructions or function calls to one of databases 86 (direct or via networking facility 84), memory access instructions, CPU logic instructions, and CPU control instructions. An optional eighth code directs processor(s) 81 to perform the above-described third validation test prior to the execution of one or both of the above-described fifth and sixth codes. The eighth code directs the processor(s) to access one of databases 86 that tracks consumer accounts or account numbers that have been used in fraudulent activities to determine if the selected consumer account or its corresponding account number is found in the accessed database. If it is found, the eighth code directs the processors(s) to not execute the sixth code, and optionally to not execute the fifth code. An optional ninth code directs processor(s) 81 to perform the above-described fourth validation test prior to the execution of one or more of the above-described fourth, fifth, and sixth codes. The ninth code directs processor(s) 81 to compare the identification code received in the request message (as obtained and stored by the processor(s) under the direction of the first and second codes) against the unique identification code stored in the obtained account record. If the two identification codes are not equal, the ninth code directs processors(s) 81 to not execute the sixth code, and optionally to not execute the fourth code and/or fourth code. An optional tenth code directs processor(s) 81 to perform the above-described fifth validation test prior to the execution of one or more of the above-described fourth, fifth, and sixth codes. The tenth code directs processor(s) 81 to obtain from the received request message the network address of the SMS gate 90 that routed the request message to entity 80, to access one of databases 86 that stores the network addresses of trusted SMS gateways 90 to determine if the network address of the SMS gate 90 that routed the request message to entity 80 is found in the accessed database. If it is not found, the tenth code directs the processors(s) to not execute the sixth code, and optionally to not execute the fourth code and/or fifth code. Each of the eighth, ninth, and tenth codes may comprise conventional I/O instructions or function calls to one of databases 86 (direct or via networking facility 84), memory access instructions, CPU logic instructions, and CPU control instructions.

An optional eleventh code directs processor(s) 81 to examine the parameters data field of the accessed account record to determine if there is any indication that one or more alerts are to be sent by e-mail to the user's e-mail account. If the parameters data field has an indication that an alert is to be sent if a request for a device verification value has been made, and such a request has in fact been made, the eleventh code directs processor(s) 81 to send an alert message by e-mail to the user's e-mail account indicating the time and date that a request for device verification value has been made, and optionally providing an indication of the consumer account on which the request was made. If the parameters data field has an indication that an alert is to be sent if a device verification value has been sent, and if the value has actually been sent, the eleventh code directs processor(s) 81 to send an alert message by e-mail to the user's e-mail account indicating the time and date that a device verification value was sent, and optionally providing an indication of the consumer account for which the value was intended. If the parameters data field has an indication that an alert is to be sent if a request for a device verification value has been denied, and such a request has in fact been denied (such as for failing one or more validation tests), the eleventh code directs processor(s) 81 to send an alert message by e-mail to the user's e-mail account indicating the time and date that a request for device verification value was made and/or denied, and optionally providing an indication of the consumer account on which the request was denied. If the user has elected that two or more of the above alerts be generated, the eleventh code may further direct processor(s) 81 to combine alerts into a single e-mail message. The eleventh code may comprise conventional I/O instructions or function calls to one of databases 86 (direct or via networking facility 84), memory access instructions, CPU logic instructions, and CPU control instructions.

In view of this disclosure, the above codes of provision entity 80 may be implemented by one of ordinary skill in the software art without undue experimentation.

Various exemplary methods of obtaining datum of dCVV2 values that can be executed by provision entity 80 with the above-described fifth code are now described. In a first implementation, the issuing bank 60 for the portable consumer device 5 may provide provision entity 80 with a list of datums indicative of dCVV2 values that are to be used, and one or more conditions under which the listed datums are to be given out. For example, a condition may specify that the listed datums are to be given out as follows: (1) one listed datum per request (per transaction), (2) one listed datum per group of N requests (N transactions), or (3) one listed datum for all requests (transactions) occurring within a selected time period (such as 12 hours, 1 day, two days, three days, etc). Provision entity 80 may store the listed datums and condition(s) in the dCVV2 method data field of the user's account record (shown in FIG. 2), or may store the listed datums and condition(s) in an auxiliary record located in another one of databases 86 along with an indication of the consumer account. The auxiliary record and the user's account record (shown in FIG. 2) may be linked to one another. Provision entity 80 may be configured to request additional listed datums when needed, or the issuing bank may periodically send listed datums. The listed datums may comprise the actual dCVV2 values, or information that can be used to generate dCVV2 values at the communication device 7. When provision entity 80 receives a request for a dCVV2 value, it obtains a user account record and selects a consumer account of a portable consumer device 5 as described above, and thereafter locates the listed datum and condition(s) from the user account record (e.g., dCVV2 method data field) or the auxiliary record. In this manner, provision entity 80 may obtain the datum of the dCVV2 value to be sent. In further implementations, the issuing bank 60 may provide provision entity 80 with the actual dCVV2 values, and provision 80 may generate the datum as an encoding of the actual dCVV2 value, which may be done by an algorithm determined by the issuing bank or provisioning entity 80. For these tasks related to obtaining datum of dCVV2 values, provision entity 80 may comprise code embodied on computer-readable medium 82 that directs data processor 81 to communicate with the issuing bank to receive the listed datum and condition(s), to store the listed datum and condition(s) in the user account record or the auxiliary record (both of which includes a computer-readable medium), and to look up the listed datum and condition(s) in response to receiving a request for a dCVV2 value (including identifying and selecting the consumer account from the request). The above codes can be implemented with conventional I/O instructions, memory access instructions, database function calls, networking function calls, CPU arithmetic instructions, CPU logic instructions, and CPU control instructions. In view of this disclosure, the codes may be implemented by one of ordinary skill in the software art without undue experimentation.

In a second implementation of obtaining the datum of dCVV2 values that can be executed by provision entity 80, the issuing bank 60 for the portable consumer device 5 may provide provision entity 80 with an algorithm or indication thereof for generating the datums indicative of dCVV2 values that are to be used. The algorithm provides a new datum for each request (transaction), a new datum for each group of N requests (N transactions), or a new datum for all requests (transactions) occurring within a selected time period (such as 12 hours, 1 day, two days, three days, etc). Provision entity 80 may store the algorithm (or indication thereof) and any associated parameters in the dCVV2 method data field of the user's account record (shown in FIG. 2), or may store the algorithm (or indication thereof) and associated parameters in an auxiliary record located in another one of databases 86 along with an indication of the consumer account. The auxiliary record and the user's account record (shown in FIG. 2) may be linked to one another. Since many issuing banks will use the same algorithm for its card holders (but use different parameters), it is more memory efficient to store the algorithm once in one of databases 86, and to store indications of the algorithm (such as in the form of a record pointer) in the user's account record (shown in FIG. 2) or auxiliary record, along with individualized parameters. However, the algorithm can be stored as a script or a method data object in the dCVV2 method data field of the user's account record. When provision entity 80 receives a request for a dCVV2 value, it obtains a user account record and selects a consumer account of a portable consumer device 5 as described above, and thereafter locates the stored algorithm or algorithm indication, and any associated parameters, from the user account record (e.g., dCVV2 method data field) or the auxiliary record, and executes the located algorithm. In this manner, provision entity 80 may obtain the datum of the dCVV2 value to be sent. The algorithm may include generating the actual dCVV2 value and/or encoding the dCVV2 value. For these tasks related to obtaining datum of dCVV2 values, provision entity 80 may comprise code embodied on computer-readable medium 82 that directs data processor 81 to communicate with the issuing bank to receive the algorithm (or indication thereof) and any associated parameters, to store the algorithm (or indication thereof) and any associated parameters in an account record or auxiliary record of database 86 (which includes a computer-readable medium), and to look up the algorithm in response to receiving a request for a dCVV2 value (including identifying the consumer account number from the request). The above codes can be implemented with conventional I/O instructions, memory access instructions, database function calls, networking function calls, CPU arithmetic instructions, CPU logic instructions, and CPU control instructions. In view of this disclosure, the codes may be implemented by one of ordinary skill in the software art without undue experimentation.

In a third implementation of obtaining datum of dCVV2 values that can be executed by provision entity 80, provision entity 80 may generate the datum values by determining the identity of the issuing bank from the selected consumer account, sending an electronic message to the issuing bank through a secure channel to request a dCVV2 datum for use, receiving a dCVV2 datum from the issuing bank through a secure channel, and sending the received dCVV2 datum to personal communications device 7, and optionally sending the received dCVV2 datum to payment processing network 70. For this implementation, provision entity 80 may comprise code embodied on computer-readable medium 82 that directs data processor 81 to determine the identity of the issuing bank from the selected consumer account, to send an electronic message to the issuing bank (preferably through a secure channel) to request a dCVV2 datum for use, to receive a dCVV2 datum from the issuing bank (preferably through a secure channel), and to send the received dCVV2 datum to personal communications device 7, and optionally to payment processing network 70. The above codes can be implemented with conventional I/O instructions, memory access instructions, database function calls, networking function calls, CPU arithmetic instructions, CPU logic instructions, and CPU control instructions. In view of this disclosure, the codes may be implemented by one of ordinary skill in the art without undue experimentation.

In a fourth implementation of obtaining datum of dCVV2 values that can be executed by provision entity 80, provision entity 80 may generate the datum values by any process, and send the generated datum to both personal communications device 7 and the authorizing entities for the transaction, which may be one or both of payment processing network 70 and issuing bank 60. The process may be specific to a particular portable consumer device 5, specific to a particular user 1 (e.g., all of the user's devices 5), specific to a group of users, specific to a group of devices (such as devices issued by a particular bank 60), or general to all devices 5. An exemplary process may include the user of a pseudo-random number generator. For this implementation, provision entity 80 may comprise code embodied on computer-readable medium 82 that directs data processor 81 to generate the datum for the dCVV2 value in response to a request according to the selected process, and to communicate the datum to personal communication device 7 and payment processing network 70 and/or issuing bank 60. The code may include code that directs data processor 81 to determine the identity of the issuing bank from the selected consumer account (as determined from the obtained account record), and to send an electronic message to the issuing bank (preferably through a secure channel) with an indication of the device verification value and the selected consumer account. The above codes can be implemented with conventional I/O instructions, memory access instructions, database function calls, networking function calls, CPU arithmetic instructions, CPU logic instructions, and CPU control instructions. In view of this disclosure, the codes may be implemented by one of ordinary skill in the art without undue experimentation.

A second set of embodiments is similar to the above-described first set of embodiments, except that a code application is provided on personal communications device 7 to send requests for dCVV2 values to provision entity 80. As an example, device 7 may comprise an Apple™ iPhone™, and the code application may comprise a third-party iPhone™ application offered or provided to user 1 by the operator of provision entity 80 or issuing bank 60. FIG. 4 illustrates a generic personal communications device 200 that may be used for these embodiments with an exemplary code application 205. Device 200 comprises a processor 201, a computer-readable medium 202 that stores data, an operating system (which may be relatively minimal), and instructions that direct the operation of processor 201, a telecommunication facility 203 that communicates with a telecommunication network (such as through a cell tower), an antenna 204 coupled to telecommunications facility 203, and a user interface 206 that has a touch screen display 207, speaker SPK, and microphone MIC. As an option, personal communications device 200 may also comprise a networking facility 210 capable of communicating with a wireless router or gateway that is coupled to the Internet (e.g., WiFi station), and an antenna 211 coupled to networking facility 210. Processor 201 is electrically coupled to computer-readable medium 202, user interface 206, telecommunications facility 203, and networking facility 210. Finally, personal communications device 200 conventionally has a clock 212 for tracking time and dates for various applications. Clock 212 may be a simple counter of seconds, or fractions thereof, that can be read by processor 201 by an I/O operation, or may comprise a more complex arrangement of hardware or firmware that can provide the various components of the current date and time (year, month, day, hour, minute, and second) in various registers that can be read by processor 201 using one or more I/O operations.

Application 205 can be stored on computer-readable medium 202. Application 205 directs processor 201 to present a graphical-user interface (GUI) button 208 with a suitable image or text that the user can associate with requesting dCVV2 values. In response to GUI button 208 being activated, application 205 directs processor 201 to send a text message to provision entity 80 to request a dCVV2 value. The short or long message code for provision entity 80 may be stored in the code of application 205 (and in turn may be stored in medium 202). As indicated above, the text message need not provide an account number or code phrase of a portable consumer device 5. However, application 205 may be further configured to provide a configuration screen to user 1 to receive one or more account numbers (or portions thereof, such as the last 3-5 digits) of the user's portable consumer devices 5 and/or a code phrase that the user has created and entered into his or her management account, and to thereafter store the account numbers (or portions thereof) and/or code phrases in computer-readable medium 202 of personal communications device 200. The configuration screen may also prompt user 1 to enter the unique identification code that was assigned to the user during the creation of the user's management account, as described above, to read the entered code, and to store the entered code in computer-readable medium 202. The configuration screen may be activated upon first use of application 205, as well as upon a double activation of GUI button 208 (e.g., two taps of the button in rapid succession, similar to a "double click" on a computer mouse). When multiple account numbers (or portions thereof) and/or code phrases are stored by application 205, application 205 may present a selection screen to the user in response to a single tap of the button, where the selection screen presents selection buttons next to representations of the stored account numbers (or portions thereof) and/or code phrases. In response to the user tapping one of these selection buttons, application 205 directs processor 201 of device 200 to send a text message to provision entity 80 that contains the selected account number (or portion thereof, i.e., an incomplete account number) or the selected code phrase, and optionally the user's unique identification code. Application 205 may then leave it to user 1 to wait for a text message from provision entity 80 providing the datum of the dCVV2 value, and to determine (e.g., read, decode, etc.) the dCVV2 value from the text message. As an option, application 205 may further direct processor 201 to scan the SMS inbox of communications device 200 for SMS messages from provision entity 80, and delete such messages that have been in the SMS inbox for more than a selected period of time. The SMS inbox may be stored as a data structure in computer-readable medium 202.

Computer-readable medium 202 also stores an operating system for the server, which enables processes and applications, such as application 205, to be executed by processor 201. The operating system provides services to these processes and applications, and enables them to access components of telecommunications facility 203, networking facility 210, user interface 206, clock 212, and portions of computer-readable medium 202. Specifically, the operating system provides an I/O communications module that enables processor 201 to communicate with user interface 206 and portions of computer-readable medium 202 (such as those used by application programs). The I/O communications module has an application programming interface (API) with a collection of functions that processor 201 can call in order to access the components. The operating system also comprises a telecommunications service module that enables processor 201 to access telecommunications facility 203, to send and receive SMS messages, to store messages in an organized manner (e.g., inbox and send box), to search stored messages, to access stored messages, and to delete stored messages. The telecommunications service module has an application programming interface (API) with a collection of functions that a processor 201 can call in order to perform the above tasks. With the above API facilities, a collection of API function calls and other instructions can be readily constructed for processor 201 to execute to carry out the above actions of application 205. The operating system also comprises one or more network services modules that can access networking facility 210 and set up communication sessions to entities on communications networks 31. Such network services modules include Microsoft's Windows Communications Foundation (e.g., .NET 3.0, .NET 4.0, etc.), Apple's CFNetwork Framework, and the OS Services Layer and the Base Services Layer of the Symbian operating system, and the like. Each of these network services modules is non-exclusive (e.g., capable of serving more than one process/application) and provides an application programming interface (API), which has a collection of functions that a processor 201 can call in order to manage communications with another entity. The above operating system, modules, and APIs all include instructions that direct the operation of processor 201.

An exemplary embodiment of application 205 may comprise the following codes stored in computer-readable medium 202. A first code directs processor 201 to present (GUI) button 208 on touch screen display 207 of user interface 206. This code may comprise a graphical icon and identifier therefor that are provided to operating system when application 205 is installed on the operating system, with a direction that the icon be loaded onto the "desktop" or equivalent thereof of the user interface 206 (and as shown on touch screen 207). When user 1 taps or clicks on the icon, the operating system starts and executes application 205. A second code of application 205 may be executed immediately upon the operating system starting application 205, or a short duration thereafter to allow the execution of a third code (as explained below). The second code may direct data processor 201 to send an SMS text message to provision entity 80 to request a dCVV2 value, such as by directing the networking facility to do so. The mobile code for entity 80 may be embedded in the second code, or may be stored in a segment of computer-readable medium 202 and accessed by processor 201 under the direction of the second code. The second code may comprise one or more function calls to the API of the telecommunications services module to send an SMS text message, wherein the telecommunication services module may include the mobile phone number of communications device 200 in the protocol (e.g., header) of the SMS text message. The mobile phone number of device 200 may be stored in computer-readable memory 202, which may have both volatile and non-volatile memory components, with the mobile phone number being stored in the non-volatile component. The second code may further direct data processor 201 to access a segment of computer-readable medium 202 for stored code phrases and/or account numbers, or portions thereof, and for the user's unique identification code (if stored), before sending the SMS text message. If only one stored code phrase or account number is found, the second code may further direct data processor 201 to include the code phrase or account number (or portion thereof) in the SMS text message that is sent to provision entity 80. The second code may also direct processor 201 to include the user's unique identification code in the SMS text message. If two or more stored code phrases and/or account numbers are found, the second code may include instructions that direct data processor 201 to present a selection screen to the user on touch screen 207 that displays representations of the stored code phrases and/or account numbers (or portions thereof) along with corresponding selection buttons, and to obtain a selection of an consumer account from user 1. The representations may be the actual code phrases and/or account numbers (or portions thereof), or text or graphical icons for the corresponding consumer accounts provided by the user or an issuing bank 60 that provided application 205 to the user. The representations may be stored in computer-readable medium 202 along with the code phrases and/or account numbers in a linked manner. In some embodiments, application 205 may be downloaded from an issuing bank 60 for user 1, and may be personalized by the issuing bank before or during downloading to include the code phrases and/or account numbers of the consumer accounts of user 1 and representations of the consumer account so that the user does not need to provide this information to application 205. The representations may also serve as the selection buttons, or may be displayed within the selection buttons. After processor 201 receives a selection of a consumer account from user 1, the second code directs processor 201 to include the code phrase or account number (or portion thereof) of the selected consumer account in the SMS text message that is sent to provision entity 80. The second code may also direct processor 201 to include the user's unique identification code in the SMS text message. For these tasks, the second code may comprise API function calls to the I/O communications module and telecommunication services module of the operating system, memory access instructions, CPU logic instructions, and CPU control instructions. In view of this disclosure, the above codes may be implemented by one of ordinary skill in the software art without undue experimentation.

The exemplary embodiment of application 205 may further comprise, as an option, a third code that is executed before the second code is executed. The third code directs data processor 201 to monitor touch screen 207 to detect a second tap within a selected time of the start of the application. If such a second tap is detected, the third code directs data process 201 to present a configuration screen that receives input from user 1 to provide one or more code phrases and/or account numbers (or portions thereof), and optionally the user's unique identification code. The configuration screen may include a numeric key pad of the Arabic numbers 0-9, and optionally alphabetic letter keys A-Z, for the user to tap in the input, areas to display the inputted codes and/or numbers, a "back" key to delete the last entered number or letter, an "enter" key to enter the code and/or account number (or portion thereof) into storage, and a "cancel" key to allow the user to exit the configuration screen. For these tasks, the third code may comprise API function calls to the I/O communications module of the operating system, memory access instructions, CPU logic instructions, and CPU control instructions. In view of this disclosure, the above codes may be implemented by one of ordinary skill in the software art without undue experimentation.

As another possible option, provision entity 80 may be configured to send an SMS text message to personal communications device 200 when the management account of user 1 is created or updated to include or change the account numbers, code phrases, and unique user identification code that are associated with the mobile phone number of device 200. The exemplary embodiment of application 205 may further comprise a fourth code that directs processor 201 to check the SMS text inbox of device 200 for such messages, to update the consumer account information stored in computer-readable medium 202 when such a message is found, and to delete the message after updating the consumer account information. Such messages can be located by examining the protocol information of the message for the mobile number of entity 80, and/or further by a particular sequence of text characters placed in a selected location of the message or message header. Processor 201 may be directed to check the SMS text inbox upon the starting of application 205 before the second code is executed, or periodically. For these tasks, the fourth code may comprise API function calls to the telecommunication services module of the operating system, memory access instructions, CPU logic instructions, and CPU control instructions. In view of this disclosure, the above codes may be implemented by one of ordinary skill in the software art without undue experimentation.

The exemplary embodiment of application 205 may further comprise, as an option, a fifth code that directs processor 201 to scan the SMS text inbox of device 200 for dCVV2 fulfillment messages from provision entity 80, and to delete each such message from the inbox except when it is the most recently received SMS text message in the inbox received from provision entity 80. Such messages can be located by examining the protocol information of the message for the mobile number of entity 80, and/or further by a particular sequence of text characters placed in a selected location of the message or message header. Processor 201 may be directed to check the SMS text inbox upon the starting of application 205 before the second code is executed, or periodically. For these tasks, the fourth code may comprise API function calls to the telecommunication services module of the operating system, memory access instructions, CPU logic instructions, and CPU control instructions. In view of this disclosure, the above codes may be implemented by one of ordinary skill in the software art without undue experimentation.

The above second through fifth codes may be executed upon application 205 being executed by the operating system, at which point application 205 may terminate. User 1 may then check the SMS text message inbox for a message from entity 80 that provides a datum indicative of the dCVV2 value. As another option, the exemplary embodiment of application 205 may further comprise a sixth code that directs processor 201 to scan the SMS text inbox of device 200 for the most recent dCVV2 fulfillment message from provision entity 80 received after the execution of the second code, to obtain the dCVV2 value from the message, and to display dCVV2 value on touch screen 207 of user interface 206 for the user. As an option, provision entity 80 may include a representation of the consumer account for which the dCVV2 value is being provided, and the sixth code may direct processor 201 to obtain this representation from the SMS text message, and to display it on touch screen 207 along with the dCVV2 value. The representation may comprise an incomplete account number or a code phrase. The sixth code can include instructions that perform simple to very complex decoding of the dCVV2 datum to obtain the dCVV2 value, thereby enabling entity 80 to send dCVV2 values with a higher degree of security. These instructions can include decrypting instructions using a decryption key stored in computer-readable medium 202. For the above tasks, the sixth code may comprise API function calls to the I/O communication module and telecommunication services module of the operating system, memory access instructions, CPU arithmetic instructions, CPU logic instructions, and CPU control instructions. In view of this disclosure, the above codes may be implemented by one of ordinary skill in the software art without undue experimentation.

In the above second set of embodiments, communications between provision entity 80 and personal communication devices 7 and 200 are performed with SMS messaging. In a third set of embodiments, some or all of this communication may be performed by simple packet messaging between entity 80 and devices 7, 200 routed via communications network 31 (e.g., using the Internet). For example, a modified version 205' of application 205 may send a dCVV2 request to provision entity 80 in a network message sent from networking facility 210 that is addressed to a universal resource identifier (URID) for entity 80. A uniform resource identifier (URID) may comprise a uniform resource locator (URL), an Internet-protocol address (IP-address), an e-mail address, or any other type of identifier or network address that can identify an entity on a communications network. The network message may be sent by any number of well-known messaging protocols, such as User Datagram Protocol (UDP), Datagram Congestion Control Protocol (DCCP), Stream Control Transmission Protocol (SCTP), Transmission Control Protocol (TCP). The network message can include one or more of the following: the mobile phone number of device 200, an account number or incomplete account number for a consumer account of a portable consumer device 5, a code phrase for a consumer account of a portable consumer device 5, the user's unique identification code, each of which may be encoded or encrypted. The protocol used to send the network message includes a URID (e.g., a network address) of device 200, which may be used by provision entity 80 to access and obtain an account record for the user, as described above. Provision entity 80 may send back a dCVV2 datum to device 200 by way of an SMS message, as described above. Instead of, or in addition to, provision entity 80 may send back a dCVV2 datum by way of a network message addressed to a URID (e.g., a network address) of device 200, with the message being routed via communications network 31 and received by networking facility 210 of device 200.

To implement the third set of embodiments, device 200 may comprise a modified version 205' of application 205. Application 205' may comprise the above-described first code of application 205 that directs processor 201 to present (GUI) button 208 on touch screen display 207 of user interface 206. Application 205' may comprise a modified version of the above described second code of application 205. The modified second code may direct data processor 201 to send a network message to provision entity 80 to request a dCVV2 value. The URID for entity 80 may be embedded in the modified second code, or may be stored in a segment of computer-readable medium 202 and accessed by processor 201 under the direction of the modified second code. The modified second code may comprise one or more function calls to the API of the network services module to send a network message, wherein the network services module may include a URID (e.g., the network address) of communications device 200 in the protocol of the network message. The modified second code may further direct data processor 201 to access one or more segments of computer-readable medium 202 for the mobile phone number and/or the unique identification code for user 1, before sending the network message. The modified second code may further direct data processor 201 to access a segment of computer-readable medium 202 for stored code phrases and/or account numbers, or portions thereof, before sending the network message. If only one stored code phrase or account number is found, the modified second code may further direct data processor 201 to include the code phrase or account number (or portion thereof) in the network message that is sent to provision entity 80. If two or more stored code phrases and/or account numbers are found, the modified second code may include instructions that direct data processor 201 to present the above-described selection screen to the user on touch screen 207 that displays representations of the stored consumer accounts along with corresponding selection buttons, and to obtain a selection of an consumer account from user 1, as described above. For these tasks, the modified second code may comprise API function calls to the I/O communications module and network services module of the operating system, memory access instructions, CPU logic instructions, and CPU control instructions. In view of this disclosure, the above codes may be implemented by one of ordinary skill in the art without undue experimentation.

The modified version 205' of application 205 may comprise the third, forth, fifth, and sixth codes of application 205, and may accordingly receive update messages and dCVV2 fulfillment messages in the form of SMS messages. In some implementations, the fifth code may be omitted in the modified version 205', and a modified version of the sixth code may be used. The modified sixth code directs processor 201 to receive a network message (e.g., dCVV2 fulfillment message) from provision entity 80 after the execution of the modified second code, to obtain the dCVV2 value from the so-received message, and to display the dCVV2 value on touch screen 207 of user interface 206 for the user. The modified sixth code can include instructions that perform simple to very complex decoding of the dCVV2 datum to obtain the dCVV2 value, thereby enabling entity 80 to send dCVV2 values with a higher degree of security. These instructions can include decrypting instructions using a decryption key stored in computer-readable medium 202. For the above tasks, the modified sixth code may comprise API function calls to the I/O communication module and network services module of the operating system, memory access instructions, CPU logic instructions, and CPU control instructions. In view of this disclosure, the above codes may be implemented by one of ordinary skill in the software art without undue experimentation.

In the above set of embodiments, provision entity 80 may be further configured to send a time datum with the dCVV2 datum, where the time datum provides an indication of how long a period of time the dCVV2 datum is valid. The time datum may provide this indication in the form of an absolute point in time that is to be detected using a clock of device 200, with the presumption that the clocks of entity 80 and device 200 are sufficiently synchronized, or in the form of a relative period of time measured against the time that the fulfillment message is received in device 200. The above described fourth code of provision entity 80 may be modified to include instructions to generate the time datum based on information in the account record for the user and the value of its clock 88. The modifications to the code can be implemented with conventional I/O instructions, memory access instructions, CPU arithmetic instructions, CPU logic instructions, and CPU control instructions. In view of this disclosure, the above modified codes may be implemented by one of ordinary skill in the software art without undue experimentation.

Each of applications 205 and 205' may have their second codes modified to include instructions that first check computer-readable medium 202 for an indication of the last received dCVV2 value and the associated time datum to determine if a request to provision entity 80 needs to be sent. (The indication may comprise the last received text message from provision entity 80 in the user's text inbox.) If the time datum indicates that the last received dCVV2 datum is still good, as compared to the time indicated by clock 212, applications 205 and 205' may simply display the dCVV2 value indicated by the last received dCVV2 datum. For this, the additional instructions of the modified second code of each application may include: (1) memory access instructions that direct the data processor to retrieve from computer-readable memory 202 the indication of the last received dCVV2 datum, associated time datum, and optionally the receipt time; (2) I/O instructions that direct the data processor to obtain the current time and date from clock 212; (3) CPU arithmetic and logic instructions that direct the data processor to determine if the last received dCVV2 datum is still good (valid) from the current time and date, the time datum, and optionally the receipt time of the last dVV2 datum by device 200 (the receipt time may be used in some cases where the time period is measured from the receipt time); and (4) CPU control instructions that direct the data processor to proceed normally with the remainder of the second code (which sends the request to entity 80) if the last dCVV2 datum is no longer valid, or to bypass the remainder of the second code and to jump to the above-described fifth or sixth codes (which display the dCVV2 value from the last received dCVV2 datum) if the last dCVV2 datum is valid. If the second code is executed to obtain a new dCVV2 datum and associated time datum, indications of these newly-obtained datum (and optionally time of receipt) are stored in computer-readable memory 202 for use the next time application 205 or 205' is called. In view of this disclosure, the above instructions and modifications may be implemented by one of ordinary skill in the software art without undue experimentation.

As further variations of the above embodiments that use time datum, it may be appreciated that the time of receipt of a message from entity 80 having a dCVV2 datum can effectively serve as the time datum, and that entity 80 does not need to send the time datum. In these embodiments, applications 205 and 205' and entity 80 may have a shared understanding of how long a dCVV2 value is valid from the time of its receipt. The validity period for the dCVV2 value may be a given amount of time as measured from the receipt time (e.g., relative time period), such as three days from the receipt time. The validity period may also be for certain days of the week as determined by the receipt time (e.g., absolute time period). As an example of the latter, the days of the month may be divided into groups of five consecutive days, such as days 1-5, 6-10, 11-15, etc. A dCVV2 datum received during a particular group of days would be valid for the days of that group (for example, a dCVV2 value received on day 12 of a month would be valid for days 11-15). Provision entity 80 may send a message with a dCVV2 datum as described above, but without a time datum. The shared understanding may be embodied in a time-period algorithm that can be embodied in each of codes 85, 205, and 205' as one or more instructions, embodied on a computer-readable medium, that direct a processor to determine if the validity period has expired from the current time and the receipt time.

For this embodiment, each of applications 205 and 205' may have their second codes modified to include instructions that first check computer-readable medium 202 for an indication of the last received dCVV2 datum and the associated receipt time to determine if a request to provision entity 80 needs to be sent. (The indication may comprise the last received text message from provision entity 80 in the user's text inbox, which includes a receipt time.) If the receipt time indicates that the last received dCVV2 datum is still good, as determined by the time indicated by clock 212 and the time-period algorithm, applications 205 and 205' may simply display the dCVV2 value indicated by the last received dCVV2 datum. For this, the additional instructions of the modified second code of each application may include: (1) memory access instructions that direct the data processor to retrieve from computer-readable memory 202 the indication of the last received dCVV2 datum and associated receipt time, (2) I/O instructions that direct the data processor to obtain the current time and date from clock 212; (3) CPU arithmetic and logic instructions that implement the time-period algorithm and that direct the data processor to determine if the last received dCVV2 datum is still good (valid) from the following: the current time and date, the receipt time, and the time-period algorithm; and (4) CPU control instructions that direct the data processor to proceed normally with the remainder of the second code (which sends the request to entity 80) if the last dCVV2 datum is no longer valid, or to bypass the remainder of the second code and to jump to the above-described fifth or sixth codes (which display the dCVV2 value from the last received dCVV2 datum) if the last dCVV2 datum is valid. If the second code is executed to obtain a new dCVV2 datum, indications of newly-obtained dCVV2 datum and associated receipt time are stored in computer-readable memory 202 for use the next time application 205 or 205' is called. In view of this disclosure, the above instructions and modifications may be implemented by one of ordinary skill in the software art without undue experimentation.

Each of the above-described embodiments for provision entity 80 may be modified so that it unilaterally sends a dCVV2 datum (and optionally a time datum) without receiving a request from device 200. For example, provision entity 80 may periodically or intermittently send a dCVV2 datum and optionally a time datum to device 200. The above-modified versions of Applications 200 and 205' may be used in this implementation of entity 80 without further modification, or the applications may be further modified to omit the instructions pertaining to sending requests for dVCC2 datums. In this modified embodiment, provision entity 80 may comprise a first code that scans through the account records and generates dCVV2 datums and optionally associated time datums (using instructions described above) according to one or more selected time intervals, and a second code that sends the dCVV2 datums and optionally time datums to the personal communication devices 7 of the users (using instructions described above). As a further modification, provision entity 80 may send the dCVV2 datum (and optionally the time datum) along with a normal transaction notification message.

As an illustration of the last-mentioned modification, a normal transaction notification message can be sent to provision entity 80 by payment processing network 70 or by an issuing bank 60 when a transaction for the user has been approved. The transaction notification message can include one or more details of the transaction, such as the transaction amount, merchant name, transaction date and time, information that identifies the user or the consumer account (e.g., portable consumer device) that was involved in the transaction, and an optional contact number for fraud notification. Provision entity 80 can access the account record for the user based on the information provided in the received message that identifies the consumer account (e.g., account number) or the user (e.g., the user's unique identification code). Provision entity 80 may then access the method data field of the accessed account record to determine how it is to obtain a dCVV2 datum for the user. Once provision entity 80 obtains the dCVV2 datum, it can add it to the transaction notification message. Provision entity 80 can also delete the information that identifies the user from the notification message, and replace this information with a code phrase or incomplete account number. For example, the transaction notification message from network 70 or bank 60 may reads as follows: "A charge of $59.25 against account No. 4444-1234-5678-9012 to ABC Co. was processed on Jan. 1, 2010 at 4:58 PM. Call 1-800-123-4567 if this charge was not approved." It may also read in a form that only has the pertinent information, such as: "59.25 4444-1234-5678-9012 ABC_Co. 1-1-2010 20:58 1-800-123-4567." The modified transaction message generated by provision entity 80 and sent to the user may read as follows: "A charge of $59.25 against the account ending in 9012 to ABC Co. was processed on Jan. 1, 2010 at 4:58 PM. Call 1-800-123-4567 if this charge was not approved. Your next dCVV2 value is 832." Provision entity 80 can access the Reply Route data field of the accessed account record to determine which phone number and/or network address to use for messages to the user, and can then send the modified transaction notification message to the determined phone number and/or network address.

To implement the above illustrate embodiment, application 85 may have the following supplemental codes described below. A first supplemental code directs data processor(s) 81 to receive a first message (such as from network 70 or bank 60), the first message comprising transaction information and an identifier that identifies a user or identifies a consumer account of a user. A second supplemental code directs data processor(s) 81 to obtain the identifier from the first message. The first and second supplemental codes may comprise function calls to the network services module of the operating system and conventional I/O instructions to networking facility 84, memory access instructions, CPU logic instructions, and CPU control instructions. A third supplemental code directs data processor(s) 81 to obtain an account record that contains the obtained identifier, the account record associating a consumer account of a portable consumer device with the obtained identifier, and at least one of a phone number or network address of a personal communication device with the obtained identifier. If the obtained account record has more than one consumer account, the third supplemental code may further direct the data processor to select one of the consumer accounts from the obtained account record as the consumer account for which the datum is obtained. This selection may be based on an account number, incomplete account number, or code phrase contained in the obtained identifier. For example, the third supplemental code may direct the data processor to match the obtained identifier or a portion thereof to the account numbers and code phrases in the obtained account record. The third supplemental code may comprise conventional I/O instructions or function calls to one of databases 86 that holds the account records (e.g., a function call directly to the database or via networking facility 84), memory access instructions, and CPU control instructions.

A fourth supplemental code directs data processor(s) 81 to obtain a datum indicative of a device verification value for the consumer account of the obtained account record. The fourth supplemental code may be implemented by the various exemplary codes described above to obtain the datum. A fifth supplemental code directs data processor(s) 81 to generate a second message that includes the obtained datum and at least a portion of the transaction information of the first message. The fourth code may further direct processor(s) 81 to include in the second message a representation of the consumer account for which the dCVV2 value is being provided. The representation may comprise the incomplete account number or code phrase associated with the consumer account selected from the obtained account record. The fourth and fifth supplemental codes may each comprise conventional memory access instructions, CPU logic instructions, and CPU control instructions. A sixth supplemental code directs data processor(s) 81 to send the second message to at least one of a phone number or network address of a personal communication device 7 associated with the consumer account of the obtained account record. In other implementations, the sixth code may direct processor(s) 81 to read the Reply Route data field for the consumer account (shown in FIG. 2) to determine which route(s) to use, and to then use network address and/or mobile phone number stored in the obtained account record. The sixth code may comprise function calls to the network services module of the operating system and conventional I/O instructions to networking facility 84, memory access instructions, CPU logic instructions, and CPU control instructions.

The above supplemental codes may be implemented alone as a stand-alone computer program product, or may be implemented with other codes described herein. If the supplemental codes are implemented in stand-alone form, it may be appreciated that various of the other codes described herein may be added to them to provide further features, such as providing the time datum. In view of this disclosure, the supplemental codes may be implemented by one of ordinary skill in the art without undue experimentation.

The above supplemental codes provide an exemplary implementation of the following method of providing a device verification value for a portable consumer device. The method comprises: (a) receiving, at a server, a first message comprising transaction information and an identifier that identifies a user or a consumer account of a user; (b) obtaining the identifier from the first message; (c) obtaining an account record that contains the obtained identifier, the account record associating a consumer account of a portable consumer device with the obtained identifier, and at least one of a phone number or network address of a personal communication device with the obtained identifier; (d) obtaining a datum indicative of a device verification value for the consumer account of the obtained account record; (e) generating a second message that includes the obtained datum and at least a portion of the transaction information of the first message; and (f) sending the second message to at least one of a phone number or network address of a personal communication device associated with the consumer account of the obtained account record. When the obtained account record associates a plurality of consumer accounts of portable consumer devices with the obtained identifier, the method may further comprise selecting one of the consumer accounts from the obtained account record as the consumer account for which the datum is obtained. This selection may be based on an account number, incomplete account number, or code phrase contained in the obtained identifier. For example, the obtained identifier or a portion thereof may be compared and matched to the account numbers and code phrases in the obtained account record.

Figure 5:
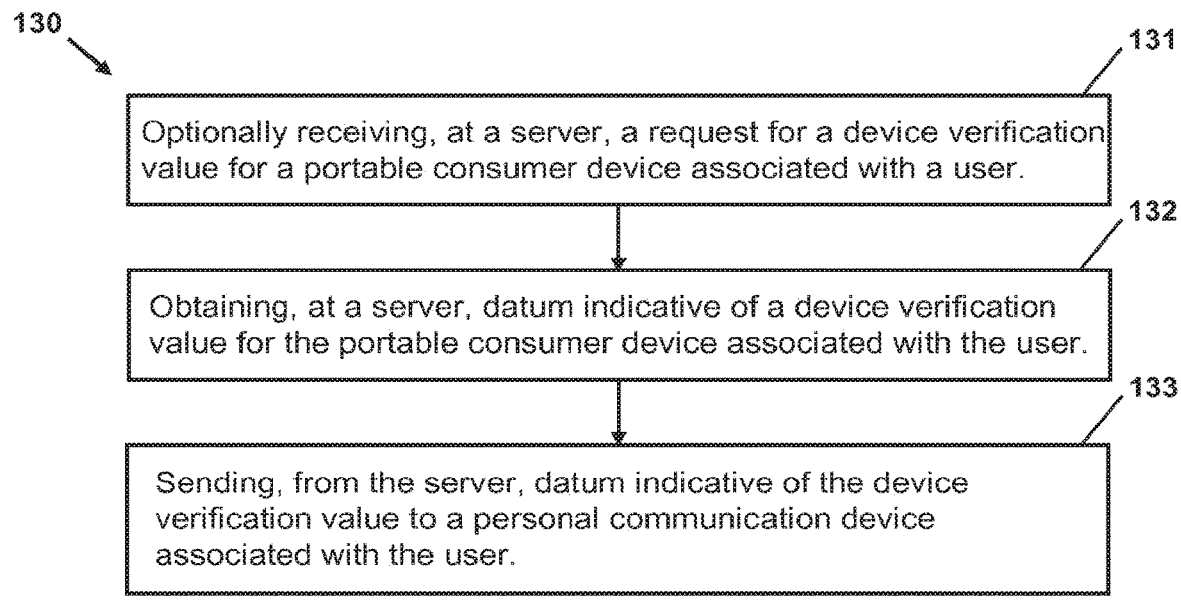
FIG. 5 shows a flow diagram illustrating general actions of various method embodiments.

FIG. 5 illustrates a general exemplary embodiment 130 of a method of providing dCVV2 datums that may be implemented by provision entity 80. Exemplary method 130 comprises a plurality of actions 131-133. Action 131, which is optional in some implementations, comprises receiving, at a server, a request for a device verification value for a portable consumer device 5 associated with a user 1. Action 132 comprises obtaining, at the server, datum indicative of a device verification value (dCVV2 value) for the portable consumer device 5 associated with the user 1. Various implementations of obtaining the datum have been described above. Action 133 comprises sending, from the server, a datum indicative of the device verification value (dCVV2 value) to a personal communication device associated with the user. Various implementations of sending the datum have been described above. Action 133 may include sending a time datum that is indicative of a time period over which the dVCC2 value in the dVCC2 datum is valid. If action 131 is not employed, actions 132 and 133 may be performed unilaterally by the server, or in response to forwarding information about a transaction.

Figure 6:
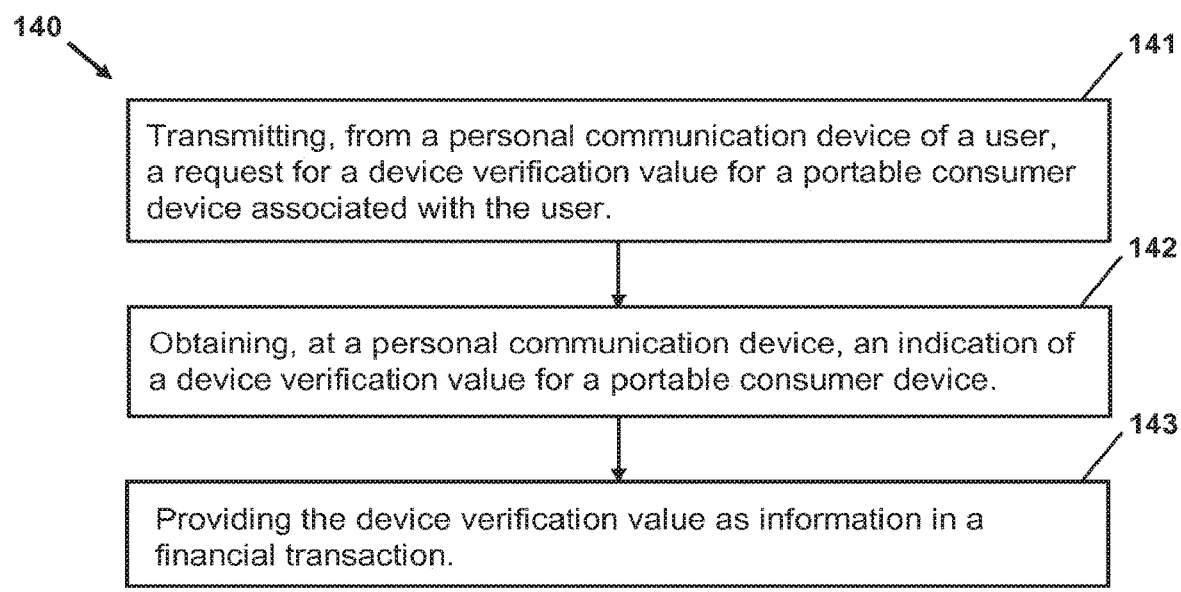
FIG. 6 shows a flow diagram illustrating general actions of various method embodiments.

FIG. 6 illustrates a general exemplary embodiment 140 of a method of obtaining and using a dCVV2 datum. Exemplary method 140 comprises a plurality of actions 141-143. Action 141 comprises transmitting, from a personal communication device of a user, a request for a device verification value for a portable consumer device associated with the user. Action 142 comprises obtaining, at a personal communication device, an indication of a device verification value for a portable consumer device. Action 143 comprises providing the device verification value as information in a financial transaction. In one implementation, action 141 may comprise sending, using a personal communication device, a message to a provision entity requesting a device verification value for a consumer account, the consumer account having an account number that identifies the consumer account within a payment processing network, the message comprising at least one of a code phrase or identification code that is different from said account number. The message may further comprise a phone number or network address of a personal communication device. The unique identification code may uniquely identify a user. Action 142 may comprise receiving, at the personal communication device, a device verification value for the consumer account. Action 143 may comprise providing information related to the consumer account to a merchant for a transaction with the merchant, the information including the received device verification value. In another implementation, action 141 may comprise sending, using a personal communication device, a message to a provision entity requesting a device verification value for a consumer account, the consumer account having an account number that identifies the consumer account within a payment processing network, the message comprising an incomplete part of said account number. The message may further comprise a phone number or network address of a personal communication device. The message may further comprise a unique identification code that is different from the account number, and that uniquely identifies a user. Action 142 may comprise receiving, at the personal communication device, a device verification value for the consumer account. Action 143 may comprise providing information related to the consumer account to a merchant for a transaction with the merchant, the information including the received device verification value.

In each of the above embodiments, one or more portable consumer devices 5 may be combined and electronically integrated with personal communication device 7 and provided as a single physical unit.

Alerts including data for use in completing transactions. While the above embodiments have focused on device verification values for purchase transactions, the inventors have recognized that a verification value is one of several pieces of information that may be associated with a transaction, and that the above embodiments may be configured to process (e.g., to obtain, receive, and send) other pieces of transaction-related information. For example, in some exemplary embodiments, a message may be sent from provision entity 80 to user 1 (FIG. 1) during a transaction in order to assist with the transaction. For example, user 1 may need to provide, to the merchant or other appropriate party, certain information in order to complete the transaction, such as a billing zip code, a PIN (personal identification number), an expiration date, a card security code (e.g. CVV, CVVC, etc), or other required information. During the transaction, user 1 may inadvertently omit or incorrectly enter some of the required information. In some exemplary embodiments, user 1 may receive a message (such as an SMS message or network message) with the omitted or corrected information to allow for completion of the transaction. For example, during a transaction using a credit card (such as at a gas station on a business trip), user 1 may be asked to provide the billing address of the credit card. The credit card may be associated with an employer of user 1, such that user 1 may not know the correct billing address. Upon a certain trigger (e.g. inputting the wrong information during the transaction, user 1 requesting the information, etc.), a message may be sent to the personal communications device 7 of user 1 (e.g., a wireless phone registered as belonging to user 1). This message can contain the billing address for the credit card. User 1 can then supply the correct information, allowing the transaction to finish.

In certain embodiments, the message may only include a portion of the omitted or corrected information, or a hint regarding the omitted or corrected information, to prevent unauthorized transactions. For example, if user 1 provides the wrong information during a transaction, user 1 may receive a message (such as an SMS message) with a hint, such as "use your work address for the billing address." Another example of the hint may be "please enter your work zip code, not your current zip code." In certain embodiments, the message may include information for a future transaction. For example, once a first transaction has been completed, user 1 may receive a message containing a PIN code, a card security code, or other information that will be needed to complete a later, second transaction, such as the next transaction. This can prevent unauthorized transactions, as even if the portable consumer device 7 is compromised, the message containing the information can still be secure.

Referring to FIG. 1, omitted or incorrect information may be detected by payment processing network 70 when merchant 20 sends the transaction information to network 70 for authorization. Network 70 may determine which piece of information is omitted or incorrect, and may send a message to provision entity 80 instructing entity 80 to send a message to user 1 providing an indication of which piece of information was omitted or incorrect, and optionally providing the omitted or corrected piece of information or a hint thereto. The message sent from payment processing network 70 to provision entity 80 includes the account number of the portable consumer device 5 so that entity 80 may find the mobile phone number or URID (e.g., the network address) of personal communication device 7 from one of its databases 86. The message sent from network 70 to entity 80 may also include the text that is to be displayed to user 1 so that entity 80 may simply forward this text to user 1. When the mobile phone number or URID (e.g., the network address) is located from one of databases 86 by provision entity 80, the entity can simply forward the text in a message to user 1. At substantially the same time, network 70 may send a message to merchant 20 instructing the merchant to reacquire the payment information from user 1 and to retry the transaction with the reentered payment information. User 1 may then receive a message from entity 80 with text of what information was omitted or incorrect, which may contain an indication of how to correct the entry of the payment information. User 1 may then proceed with a complete and correct entry of the payment information with merchant 20. Merchant 20 may then resend the authorization request to payment processing network 70.

To implement the above, computer-readable medium 82 of provision entity 80 may store an application 85' having the following codes. A first code directs processor(s) 81 to receive a request message from payment processing network 70 and to place in temporary memory storage the following: a message datum from the request message indicating a piece of information for a portable consumer device, and an account number of the portable consumer device 7 associated with user 1. The request message from payment processing network 70 may implicitly serve as a request to provision entity 80 to provide the message datum to user 1, or the request message may contain an explicit direction to do so. The first code may comprise function calls to the network services module of the operating system of entity 80 and conventional I/O instructions to networking facility 84, memory access instructions, CPU logic instructions, and CPU control instructions. A second code of application 85' directs processor(s) 81 to access a record of user 1 based upon the account number provided in the request message, the record having at least one of a mobile phone number or a URID (e.g., the network address) of the user's portable consumer device 7 that has been associated with the account number. The second code may comprise conventional I/O instructions or function calls to one of databases 86 (direct or via networking facility 84), memory access instructions, and CPU control instructions. A third code of application 85' directs processor(s) 81 to send an alert message to the mobile phone number or URID (e.g., the network address) of personal communication device 7 in the form of a text message routed through SMS gateway 90 or a network message routed through first communications network 31, with the alert message having the message datum indicative of the piece of information. The third code may comprise function calls to the network services module of the operating system and conventional I/O instructions to networking facility 84, memory access instructions, CPU logic instructions, and CPU control instructions. The codes of this application for provision entity 80 may be implemented by one of ordinary skill in the software art without undue experimentation.

As another implementation approach, payment processing network 70 may be combined with provision entity 80, in which case a formal message from network 70 to entity 80 does not need to be sent. Computer-readable medium 82 of provision entity 80 may store an application 85" having the following codes for the merged operation of network 70 and entity 80. A first code directs processor(s) 81 to receive an authorization request message from a merchant 20 which includes payment information, and to store the payment information in temporary memory storage. The first code may comprise function calls to the network services module of the operating system of entity 80 and conventional I/O instructions to networking facility 84, memory access instructions, CPU logic instructions, and CPU control instructions. A second code directs processor(s) 81 to access a record of payment information for the account number provided in the authorization request message, the record having at least one of a mobile phone number or the URID (e.g., the network address) of the user's portable consumer device 7 that has been associated with the account number. The second code may comprise conventional I/O instructions or function calls to one of databases 86 (direct or via networking facility 84), memory access instructions, and CPU control instructions. A third code directs processor(s) 81 to compare the received payment information with the payment information from the accessed record to identify omitted or incorrect payment information, and to generate a message datum indicative of the omitted or incorrect payment information. A portion of the message datum, or the entire message datum, may be copied and/or derived from a message field in the accessed record, the message field being associated with the record's data field that is related to the omitted or incorrect payment information. The third code may comprise memory access instructions (the accessed record may be stored in temporary memory), CPU logic instructions, and CPU control instructions. A fourth code directs processor(s) 81 to send an alert message to the mobile phone number or the URID (e.g., the network address) of personal communication device 7 in the form of a text message routed through SMS gateway 90 or a network message routed through first communications network 31, with the alert message having the message datum indicative of the omitted or incorrect piece of information. The code may comprise function calls to the network services module of the operating system and conventional I/O instructions to networking facility 84, memory access instructions, CPU logic instructions, and CPU control instructions. The codes of application 85" for provision entity 80 may be implemented by one of ordinary skill in the software art without undue experimentation.

Embodiments of the invention are not limited to systems involving purchase transactions. The same approach could be applied for other financial systems. For example, embodiments could be used to authenticate a user using an online banking application. A cardholder may enter his user ID into a banking website. The cardholder can then use his or her personal communication device to obtain and use a dCVV2 value as a verification value. The banking website can validate the User ID and the verification value provided by the user by communicating with the provision entity.

Embodiments of the invention are not limited to the above-described embodiments. For example, although separate functional blocks are shown for an issuer, payment processing system, and acquirer, some entities perform all of these functions and may be included in embodiments of invention.

It should be understood that various embodiments of the present invention as described above can be implemented in the form of control logic using computer software in a modular or integrated manner. Based on the disclosure and teachings provided herein, a person of ordinary skill in the art will know and appreciate other ways and/or methods to implement embodiments of the present invention using hardware and a combination of hardware and software.

Any of the software components or functions described in this application, may be implemented as software code to be executed by a processor using any suitable computer language such as, for example, C, C#, Java, C++ or Perl using, for example, conventional or object-oriented techniques. The software code may be stored as a series of instructions, or commands on a computer-readable medium, such as a random access memory (RAM), a read only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

The above description is illustrative and is not restrictive. Many variations of the invention and embodiments thereof will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   obtaining, by a server, from a request, a unique identification code assigned to a user;
   obtaining, by the server, an account record that contains the obtained unique identification code, the account record associating a consumer account of a portable consumer device with the obtained unique identification code, the consumer account having an account number associated with the consumer account that identifies the consumer account, the obtained unique identification code being different from the account number of the consumer account of the obtained account record;
   obtaining, by the server, a datum associated with a device verification value for the consumer account of the obtained account record, wherein the datum associated with the device verification value is valid for a predetermined amount of time or for a plurality of transactions;
   sending, by the server, the obtained datum associated with the device verification value to at least one of a phone number or network address of a personal communication device associated with the consumer account of the obtained account record;
   receiving, by the server and from a computer, an authorization request including the device verification value, the authorization request requesting authorization for a transaction;
   determining, by the server, that the device verification value in the authorization request is valid; and
   transmitting, by the server, an authorization response to the computer indicating that the transaction is authorized after determining that the device verification value is valid.

2. The method of claim 1, wherein the obtained account record associates a plurality of consumer accounts of portable consumer devices with the obtained unique identification code, and wherein the method further comprises selecting one of the consumer accounts from the obtained account record as the consumer account for which the datum is obtained.

3. The method of claim 2, wherein the obtained account record stores one or more account numbers of one or more consumer accounts, each consumer account associated with a portable consumer device;
   wherein the method further comprises:
      obtaining an incomplete account number from the received request; and
      wherein selecting the consumer account of the portable consumer device comprises comparing the obtained incomplete account number to the one or more account numbers stored in the obtained account record to find a match between the incomplete account number and a portion of one of the stored account numbers.

4. The method of claim 2, wherein the obtained account record stores one or more code phrases of one or more consumer accounts, each consumer account corresponding to a portable consumer device;
   wherein the method further comprises obtaining a code phrase from the received request; and
   wherein selecting a consumer account of the portable consumer device comprises comparing the obtained code phrase to the one or more code phrases stored in the obtained account record to find a match between the obtained code phrase and a stored code phrase.

5. The method of claim 1, further comprising sending another datum associated with the device verification value for the consumer account and an indication of the consumer account to an entity different from the personal communication device associated with the consumer account.

6. The method of claim 1, wherein the consumer account is provided by an issuing bank, and wherein the method further comprises sending another datum associated with the device verification value for the consumer account and an indication of the consumer account to the issuing bank.

7. The method of claim 1, wherein transmitting the datum associated with the device verification value further comprises transmitting an indication of a time period in which the device verification value can be used for a transaction.

8. The method of claim 1, wherein the obtained account record comprises a data field that indicates a route by which the datum associated with the device verification value is to be sent, and wherein the method further comprises accessing the data field to determine the phone number or network address to which to send the datum.

9. The method of claim 1, further comprising comparing the consumer account against a database that tracks consumer accounts that have been used in fraudulent activities.

10. The method of claim 1, further comprising notifying the user of one or more of the following occurrences: a request for a device verification value, a sending of a device verification value, a denial of a request for a device verification value.

11. The method of claim 1 further comprising:
    determining an identity of an issuing bank computer from data in the authorization request;
    transmitting the authorization request to the issuing bank computer; and
    receiving the authorization response from the issuing bank computer.

12. A server computer comprising a data processor, and a computer program product embodied on a computer-readable medium coupled to the data processor, the computer program product comprising:
    code that obtains from a request, a unique identification code assigned to a user;
    code that obtains an account record that contains the obtained unique identification code, the account record associating a consumer account of a portable consumer device with the obtained unique identification code, the consumer account having an account number associated with the consumer account that identifies the consumer account, the obtained unique identification code being different from the account number of the consumer account of the obtained account record;
    code that obtains a datum associated with a device verification value for the consumer account of the obtained account record, wherein the datum associated with the device verification value is valid for a predetermined amount of time or for a plurality of transactions;

code that sends the obtained datum associated with the device verification value to at least one of a phone number or network address of a personal communication device associated with the consumer account of the obtained account record;

code that receives an authorization request including the device verification value, the authorization request requesting authorization for a transaction;

code that determines that the device verification value in the authorization request is valid; and code that transmits an authorization response to the computer indicating that the transaction is authorized after determining that the device verification value is valid.

13. The server computer of claim 12, wherein the obtained account record associates a plurality of consumer accounts of portable consumer devices with the obtained unique identification code, and wherein the product further comprises code that directs the data processor to select one of the consumer accounts from the obtained account record as the consumer account for which the datum is obtained.

14. The server computer of claim 13, wherein the obtained account record stores one or more account numbers of one or more consumer accounts, each consumer account associated with a portable consumer device;

wherein the computer program product further comprises code that directs the data processor to obtain an incomplete account number from the received request; and wherein the code that directs the data processor to select a consumer account of the portable consumer device comprises code that directs the data processor to compare the obtained incomplete account number to the one or more account numbers stored in the obtained account record to find a match between the incomplete account number and a portion of one of the stored account numbers.

15. The server computer of claim 12, wherein the obtained account record stores one or more code phrases of one or more consumer accounts, each consumer account associated with a portable consumer device;

wherein the computer program product further comprises code that directs the data processor to obtain a code phrase from the received request; and wherein the code that directs the data processor to select a consumer account of the portable consumer device comprises code that directs the data processor to compare the obtained code phrase to the one or more code phrases stored in the obtained account record to find a match between the obtained code phrase and a stored code phrase.

16. The server computer of claim 12, wherein the computer program product further comprises code that directs the data processor to send another datum associated with the device verification value for the consumer account and an indication of the consumer account to an entity different from the personal communication device associated with the consumer account.

17. The server computer of claim 12, wherein the consumer account is provided by an issuing bank, and wherein the computer program product further comprises code that directs the data processor to send another datum associated with the device verification value for the consumer account and an indication of the consumer account to the issuing bank.

18. The server computer of claim 12, further comprising code that directs the data processor to send an indication of a time period in which the device verification value can be used for a transaction.

19. The server computer of claim 12, wherein the obtained account record stores method data fields of consumer accounts indicating algorithms to be used to generate device verification values; and wherein the code that directs the data processor to obtain the datum associated with the device verification value for the consumer account comprises code that directs the data processor to obtain an indication of an algorithm from a method data field of the obtained account record and to execute the algorithm for which the indication was obtained.

20. The server computer of claim 12, wherein the personal communication device is a mobile phone.

21. The server computer of claim 12, wherein the computer program product further comprises code that directs the data processor to obtain the datum associated with the device verification value for the consumer account comprises code that directs the data processor to determine an identity of an issuing bank from the consumer account, to send an electronic message to the issuing bank to request the datum associated with a device verification value, and to receive the datum associated with a device verification value from the issuing bank.

22. The server computer of claim 12 wherein the computer program product further comprises code that directs the data processor to determine an identify of an issuing bank computer from data in the authorization request;

code that directs the data processor to transmit the authorization request to an issuing bank computer; and code that directs the data processor to receive the authorization response from the issuing bank computer.

23. The server computer of claim 12 wherein the datum associated with the device verification value indicates a methodology to generate the device verification value and is not itself the device verification value.

* * * * *